(12) United States Patent
Buer et al.

(10) Patent No.: US 9,264,426 B2
(45) Date of Patent: Feb. 16, 2016

(54) SYSTEM AND METHOD FOR AUTHENTICATION VIA A PROXIMATE DEVICE

(75) Inventors: Mark Buer, Payson, AZ (US); Ed Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/617,792

(22) Filed: Sep. 14, 2012

(65) Prior Publication Data

US 2013/0013925 A1 Jan. 10, 2013

Related U.S. Application Data

(63) Continuation of application No. 11/204,596, filed on Aug. 15, 2005.

(60) Provisional application No. 60/637,668, filed on Dec. 20, 2004.

(51) Int. Cl.
*H04L 29/06* (2006.01)
*H04L 9/32* (2006.01)

(52) U.S. Cl.
CPC .......... *H04L 63/0853* (2013.01); *H04L 9/3234* (2013.01); *H04L 2209/805* (2013.01)

(58) Field of Classification Search
CPC ............ H04L 63/0853; H04L 63/0823; H04L 9/3234; H04L 2209/805
USPC ............................................... 726/3; 713/171
See application file for complete search history.

(56) References Cited

U.S. PATENT DOCUMENTS

| | | | |
|---|---|---|---|
| 3,324,647 A | 6/1967 | Jedynak |
| 4,491,909 A | 1/1985 | Shimizu |
| 4,625,276 A | 11/1986 | Benton et al. |
| 4,645,338 A | 2/1987 | Juliana et al. |
| 4,774,706 A | 9/1988 | Adams |
| RE33,189 E | 3/1990 | Lee et al. |
| 5,050,207 A | 9/1991 | Hitchcock |
| 5,161,193 A | 11/1992 | Lampson et al. |

(Continued)

FOREIGN PATENT DOCUMENTS

| EP | 0876026 A2 | 11/1998 |
|---|---|---|
| EP | 1132800 A2 | 9/2001 |

(Continued)

OTHER PUBLICATIONS

Japanese Patent Abstract for Appln. No. JP 06-215009, filed Aug. 5, 1994, 1 pg.

(Continued)

*Primary Examiner* — Brandon Hoffman
*Assistant Examiner* — Thong Truong
(74) *Attorney, Agent, or Firm* — Sterne, Kessler, Goldstein & Fox P.L.L.C.

(57) ABSTRACT

Techniques are provided to authenticate components in a system. Users may enter credentials into an input device and the credentials may be authenticated and/or securely transmitted to the components. The components may then provide the credentials to a server in the system. Strong authentication may thus be provided to the effect that credentials associated with specific users have been received from specific components in the system. The server may then enable the components to access selected services.

15 Claims, 14 Drawing Sheets

(56) References Cited

U.S. PATENT DOCUMENTS

| | | |
|---|---|---|
| 5,237,616 A | 8/1993 | Abraham et al. |
| 5,297,206 A | 3/1994 | Orton |
| 5,329,623 A | 7/1994 | Smith et al. |
| 5,365,589 A | 11/1994 | Gutowitz |
| 5,471,482 A | 11/1995 | Byers et al. |
| 5,533,123 A | 7/1996 | Force et al. |
| 5,544,246 A | 8/1996 | Mandelbaum et al. |
| 5,608,778 A | 3/1997 | Partridge, III |
| 5,631,960 A | 5/1997 | Likens et al. |
| 5,668,876 A | 9/1997 | Falk et al. |
| 5,724,423 A | 3/1998 | Khello |
| 5,734,829 A | 3/1998 | Robinson |
| 5,751,809 A | 5/1998 | Davis et al. |
| 5,796,744 A | 8/1998 | Krawczak et al. |
| 5,796,829 A | 8/1998 | Newby et al. |
| 5,796,836 A | 8/1998 | Markham |
| 5,867,706 A | 2/1999 | Martin et al. |
| 5,870,474 A | 2/1999 | Wasilewski et al. |
| 5,898,479 A | 4/1999 | Hubbard et al. |
| 5,933,503 A | 8/1999 | Schell et al. |
| 5,936,967 A | 8/1999 | Baldwin et al. |
| 5,943,338 A | 8/1999 | Duclos et al. |
| 5,949,881 A | 9/1999 | Davis |
| 5,953,416 A | 9/1999 | Hasebe et al. |
| 5,983,350 A | 11/1999 | Minear et al. |
| 6,003,135 A | 12/1999 | Bialick et al. |
| 6,012,048 A | 1/2000 | Gustin et al. |
| 6,037,879 A | 3/2000 | Tuttle |
| 6,038,551 A | 3/2000 | Barlow et al. |
| 6,047,270 A | 4/2000 | Joao et al. |
| 6,085,176 A | 7/2000 | Woolston |
| 6,088,450 A | 7/2000 | Davis et al. |
| 6,101,255 A | 8/2000 | Harrison et al. |
| 6,111,858 A | 8/2000 | Greaves et al. |
| 6,115,816 A | 9/2000 | Davis |
| 6,131,090 A | 10/2000 | Basso, Jr. et al. |
| 6,131,811 A | 10/2000 | Gangi |
| 6,157,955 A | 12/2000 | Narad et al. |
| 6,189,100 B1 | 2/2001 | Barr et al. |
| 6,216,167 B1 | 4/2001 | Momirov |
| 6,226,710 B1 | 5/2001 | Melchior |
| 6,256,737 B1 | 7/2001 | Bianco et al. |
| 6,266,647 B1 | 7/2001 | Fernandez |
| 6,269,163 B1 | 7/2001 | Rivest et al. |
| 6,282,658 B2 | 8/2001 | French et al. |
| 6,295,602 B1 | 9/2001 | Weissman et al. |
| 6,295,604 B1 | 9/2001 | Callum |
| 6,320,964 B1 | 11/2001 | Callum |
| 6,321,339 B1 | 11/2001 | French et al. |
| 6,327,625 B1 | 12/2001 | Wang et al. |
| 6,349,405 B1 | 2/2002 | Welfeld |
| 6,378,072 B1 | 4/2002 | Collins et al. |
| 6,393,026 B1 | 5/2002 | Irwin |
| 6,393,270 B1 | 5/2002 | Austin et al. |
| 6,393,411 B1 | 5/2002 | Bishop et al. |
| 6,393,564 B1 | 5/2002 | Kanemitsu et al. |
| 6,397,198 B1 | 5/2002 | Hoffman |
| 6,421,730 B1 | 7/2002 | Narad et al. |
| 6,477,646 B1 | 11/2002 | Krishna et al. |
| 6,484,257 B1 | 11/2002 | Ellis |
| 6,493,347 B2 | 12/2002 | Sindhu et al. |
| 6,496,936 B1 | 12/2002 | French et al. |
| 6,609,198 B1 | 8/2003 | Wood et al. |
| 6,697,489 B1 | 2/2004 | Candelore |
| 6,701,432 B1 | 3/2004 | Deng et al. |
| 6,704,871 B1 | 3/2004 | Kaplan et al. |
| 6,708,273 B1 | 3/2004 | Ober et al. |
| 6,728,378 B2 | 4/2004 | Garib |
| 6,738,749 B1 | 5/2004 | Chasko et al. |
| 6,745,936 B1 | 6/2004 | Movalli et al. |
| 6,751,677 B1 | 6/2004 | Ilnicki et al. |
| 6,751,728 B1 | 6/2004 | Gunter et al. |
| 6,760,444 B1 | 7/2004 | Leung |
| 6,778,495 B1 | 8/2004 | Blair |
| 6,791,947 B2 | 9/2004 | Oskouy et al. |
| 6,804,357 B1 | 10/2004 | Ikonen et al. |
| 6,831,979 B2 | 12/2004 | Callum |
| 6,842,106 B2 | 1/2005 | Hughes et al. |
| 6,862,278 B1 | 3/2005 | Chang et al. |
| 6,892,307 B1 | 5/2005 | Wood et al. |
| 6,909,713 B2 | 6/2005 | Magnussen et al. |
| 6,931,379 B1 | 8/2005 | Sato et al. |
| 6,938,156 B2 | 8/2005 | Wheeler et al. |
| 6,963,843 B1 | 11/2005 | Takatsu et al. |
| 6,963,979 B2 | 11/2005 | Fairclough et al. |
| 6,981,140 B1 | 12/2005 | Choo |
| 6,983,366 B1 | 1/2006 | Huynh et al. |
| 6,983,374 B2 | 1/2006 | Hashimoto et al. |
| 6,996,842 B2 | 2/2006 | Strahm et al. |
| 6,999,943 B1 | 2/2006 | Johnson et al. |
| 7,003,118 B1 | 2/2006 | Yang et al. |
| 7,005,733 B2 | 2/2006 | Kommerling et al. |
| 7,017,042 B1 | 3/2006 | Ziai et al. |
| 7,039,641 B2 | 5/2006 | Woo |
| 7,048,183 B2 | 5/2006 | Coughlin et al. |
| 7,050,993 B1 | 5/2006 | Piikivi et al. |
| 7,055,029 B2 | 5/2006 | Collins et al. |
| 7,062,657 B2 | 6/2006 | Law |
| 7,069,444 B2 | 6/2006 | Lowensohn et al. |
| 7,086,085 B1 | 8/2006 | Brown et al. |
| 7,086,086 B2 | 8/2006 | Ellis |
| 7,110,987 B2 | 9/2006 | Engelhart |
| 7,178,034 B2 | 2/2007 | Cihula et al. |
| 7,187,267 B2 | 3/2007 | Cole |
| 7,188,360 B2 | 3/2007 | Gerdes et al. |
| 7,191,341 B2 | 3/2007 | Paaske et al. |
| 7,194,765 B2 | 3/2007 | Blom |
| 7,231,657 B2 | 6/2007 | Honarvar et al. |
| 7,239,865 B2 | 7/2007 | Dyck et al. |
| 7,269,732 B2 | 9/2007 | Kilian-Kehr |
| 7,283,630 B1 | 10/2007 | Doljack |
| 7,305,562 B1 | 12/2007 | Bianco et al. |
| 7,350,230 B2 | 3/2008 | Forrest |
| 7,357,312 B2 | 4/2008 | Gangi |
| 7,376,839 B2 | 5/2008 | Carta et al. |
| 7,434,043 B2 | 10/2008 | Buer et al. |
| 7,770,013 B2 | 8/2010 | Rhoads et al. |
| 7,832,001 B2 | 11/2010 | Noble |
| 8,166,296 B2 | 4/2012 | Buer et al. |
| 8,333,317 B2 | 12/2012 | Buer et al. |
| 2001/0001877 A1 | 5/2001 | French et al. |
| 2001/0021950 A1 | 9/2001 | Hawley et al. |
| 2002/0001384 A1 | 1/2002 | Buer et al. |
| 2002/0004902 A1 | 1/2002 | Toh et al. |
| 2002/0004904 A1 | 1/2002 | Blaker et al. |
| 2002/0009076 A1 | 1/2002 | Engbersen et al. |
| 2002/0023217 A1* | 2/2002 | Wheeler et al. ............... 713/171 |
| 2002/0039418 A1 | 4/2002 | Dror et al. |
| 2002/0044649 A1 | 4/2002 | Gallant et al. |
| 2002/0057796 A1 | 5/2002 | Lambert et al. |
| 2002/0078342 A1 | 6/2002 | Matthews, Jr. |
| 2002/0087867 A1 | 7/2002 | Oberle et al. |
| 2002/0097724 A1 | 7/2002 | Halme et al. |
| 2002/0108048 A1 | 8/2002 | Qi et al. |
| 2002/0138423 A1 | 9/2002 | Takatori et al. |
| 2002/0191790 A1 | 12/2002 | Anand et al. |
| 2003/0005144 A1 | 1/2003 | Engel et al. |
| 2003/0014627 A1 | 1/2003 | Krishna et al. |
| 2003/0023846 A1 | 1/2003 | Krishna et al. |
| 2003/0028484 A1 | 2/2003 | Boylan et al. |
| 2003/0041252 A1 | 2/2003 | Fung et al. |
| 2003/0046423 A1 | 3/2003 | Narad et al. |
| 2003/0046541 A1 | 3/2003 | Gerdes et al. |
| 2003/0051138 A1 | 3/2003 | Maeda et al. |
| 2003/0084308 A1 | 5/2003 | Van Rijnswou |
| 2003/0084309 A1 | 5/2003 | Kohn |
| 2003/0087629 A1 | 5/2003 | Juitt et al. |
| 2003/0097586 A1 | 5/2003 | Mok |
| 2003/0105960 A1 | 6/2003 | Takatori et al. |
| 2003/0132292 A1* | 7/2003 | Gomez et al. ............... 235/383 |
| 2003/0167207 A1* | 9/2003 | Berardi et al. ............... 705/16 |
| 2004/0039936 A1 | 2/2004 | Lai |
| 2004/0054914 A1 | 3/2004 | Sullivan |
| 2004/0083375 A1 | 4/2004 | Foster et al. |

(56) References Cited

U.S. PATENT DOCUMENTS

| | | | |
|---|---|---|---|
| 2004/0098600 A1 | 5/2004 | Eldeeb | |
| 2004/0123119 A1 | 6/2004 | Buer et al. | |
| 2004/0123120 A1 | 6/2004 | Buer et al. | |
| 2004/0123123 A1 | 6/2004 | Buer et al. | |
| 2004/0153649 A1 | 8/2004 | Rhoads et al. | |
| 2004/0203638 A1 | 10/2004 | Chan et al. | |
| 2004/0255034 A1 | 12/2004 | Choi | |
| 2005/0058292 A1 | 3/2005 | Diorio et al. | |
| 2005/0077348 A1 | 4/2005 | Hendrick | |
| 2005/0081040 A1 | 4/2005 | Johnson et al. | |
| 2005/0091338 A1 | 4/2005 | de la Huerga | |
| 2005/0149738 A1 | 7/2005 | Targosky | |
| 2005/0165695 A1 | 7/2005 | Berardi et al. | |
| 2006/0021041 A1 | 1/2006 | Challener et al. | |
| 2006/0064391 A1* | 3/2006 | Petrov et al. | 705/65 |
| 2006/0072761 A1 | 4/2006 | Johnson et al. | |
| 2006/0133604 A1 | 6/2006 | Buer et al. | |
| 2006/0136717 A1 | 6/2006 | Buer et al. | |
| 2009/0085724 A1 | 4/2009 | Naressi et al. | |
| 2013/0010962 A1 | 1/2013 | Buer et al. | |
| 2015/0058620 A1 | 2/2015 | Buer et al. | |

FOREIGN PATENT DOCUMENTS

| | | |
|---|---|---|
| JP | 06-215009 | 8/1994 |
| JP | 09-081519 | 3/1997 |
| JP | 2000-76336 | 3/2000 |
| JP | 2000-92236 | 3/2000 |
| WO | WO 92/11598 | 7/1992 |
| WO | WO 01/80483 A2 | 10/2001 |
| WO | WO 02/41599 A1 | 5/2002 |

OTHER PUBLICATIONS

Japanese Patent Abstract for Appln. No. JP 09-081519, filed Mar. 28, 1997, 1 pg.

Japanese Patent Abstract for Appln. No. JP 2000-76336, filed Mar. 14, 2000, 1 pg.

Japanese Patent Abstract for Appln. No. JP 2000-92236, filed Mar. 30, 2000, 1 pg.

FPGA implementation of MD5 hash algorithm; Deepalumara, J.; Heys, H.M.; Venkatesan, R.; Canadian Conference on Electrical and Computer Engineering, 2001. vol. 2, May 13-16, 2001, pp. 919-924.

Accelerating application-level security protocols; Burnside, M.; Keromytis, A.D.; The 11 the IEEE International Conference on Networks, 2003. ICON 2003, Sep. 28-Oct. 1, 2003, pp. 313-318.

Securing Web servers against insider attack; Jiang, S.; Smith, S.; Minami; K.; Proceedings 17th Annual Computer Security Applications Conference, 2001. ACSAC 2001. Dec. 10-14, 2001, pp. 265-276.

"Server ECS", Mar. 9, 1998, "http://home.expertcanmore.net/expert/servers.htm".

IPSec Overview, Jun. 5, 2001, "http://forsitesolutions.com/Techstuff/freeswan/inside_overview.html".

"RFC 2402", Oct. 1998, "http://www.ietf.org/rfc/rfc2402.txt?number—2402".

Secure Products VMS115, VLSI Technology, Inc., Printed in USA, Document Control: VMS115, VI, 0, Jan. 1999, pp. 1-2.

VMS 115 Data Sheet, VLSI Technology, Inc., a subsidiary of Philips Semiconductors, Revision 2:3, Aug. 10, 1999, pp. 1-64.

Data Sheet 7751 Encryption Processor, Network Security Processors, Jun. 1999, pp. 1-84.

Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G. S., et al., "Microsoft Point-to-Point Encryption (MPPE) Protocol", Microsoft Corporation, Network Working Group, Internet Draft, Oct. 1999, pp. 1-12.

Deutsch, P., "DEFLATE Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., et al., "IP Encapsulating Security Payload (ESP)", Network Working Group, Nov. 1998, pp. 1-22.

Maughan, D, et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Network Working Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

Compression for Broadband Data Communications, BlueSteel Networks, Inc., Sep. 8, 1999, pp. 1-9.

Securing and Accelerating e-Commerce Transactions, BlueSteel Networks, Inc., Revision 2.0, Oct. 20, 1999, pp. 1-7.

Securing Broadband Communications BlueSteel Networks, Inc., Sep. 8, 1999, pp. 1-10.

Keromytis, et al., "Implementing IPsec", Global Telecommunications Conference (Globecom), IEEE, Nov. 3, 1997, pp. 1948-1952.

Pierson, et al., "Context-Agile Encryption for High Speed Communications Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 470-474.

Smimi, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposium on VLSI, Mar. 4-6, 1999, pp. 325-328.

Analog Devices: "Analog Devices and IRE Announce First DSP-Based Internet Security System-on-a-Chip", Analog Devices Press Release, Online, Jan. 19, 1999, pp. 1-3, http://content.analog.com/pressrelease/prdisplay/0, 1622,1 6,00.html.

3Com: "3Com Launches New Era of Network Connectivity", 3Com Press Release, Jun. 14, 1999, pp. 1-3.

Analog Devices: "ADSP2141 SafeNetDPS User's Manual, Revision 6", Analog Devices Technical Specifications, Mar. 2000, XP002163401, 87 Pages.

C. Madson, R. Glenn: "RFC 2403—The Use of HMAC-MD5-96 within ESP and AH", IETF Request for Comments, Nov. 1998, XP002163402, Retrieved from Internet on Mar. 20, 2001, http://www.faqs.org/rfcs/frc2403.html, 87 Pages.

S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 5 Pages.

R. Sedgewick, "Algorithms in C—Third Edition", 1998, Addison Wesley XP002163543, pp. 573-608.

Applied Cryptography, Second Edition, Schneider, B., 1996, John Wiley & Sons, New York, XP002184521, cited in the application, p. 442, paragraph 18.7—p. 445.

SHA: The Secure Hash Algorithm Putting Message Digests to Work, Stallings, W., Dr. Dobbs Journal, Redwood City, CA, Apr. 1, 1994, p. 32-34, XP000570561.

(56) References Cited

OTHER PUBLICATIONS

Erich Nahum, David J. Yates, Sean O'Malley, Hilarie Orman, and Richard Schroeppel; "Parallelized Network Security Protocols"; 1996 IEEE; pp. 145-154.
Surech et al, "Classification Engine in a Cryptography Acceleration Chip", U.S. Appl. No. 09/610,722, filed Jul. 6, 2000, 43 pgs.
Surech et al, "Distributed Processing in a Cryptography Acceleration Chip", U.S. Appl. No. 09/610,798, filed Jul. 6, 2000, 44 pgs.
Rofheart, M., "XtremeSpectrum Multimedia WPAN PHY", document No. IEEE 802.15-00/195r8P801-15_TG3; IEEE P802.15 Working Group, Jul. 7, 2000, 39 pages.
FINREAD, Financial transactional IC card reader (FINREAD)—Part 2: Functional requirements (Ref. No. CWA 14174-2:2001 E; http://web.archive.org/web/20030418030736/http://www.finread.com/pages/about/general_overview/01_overview.html); 64 pages.
Elmadani, Smart Card and Secure Coprocessor Enhance Internet Security (Suranaree J. Sci. Technol. vol. 9 No. 2; Apr.-Jun. 2002); 6 pages.
Markovic, A PC Cryptographic Coprocessor Based on TI Signal Processor and Smart Card System (Communications and Multimedia Security Issues of the New Century, R. Steinmetz et al. (eds.); 11 pages, Dated 2001.
Corner, Protecting Applications with Transient Authentication (USENIX Association; MobiSys 2003: The First International Conference on Mobile Systems, Applications, and Services); 15 pages.
Domingo-Ferrer, Multi-application smart cards and encrypted data, processing Elsevier, Future Generation Computer Systems 13 (1997); pp. 65-74.
Pohlmann, Smart Cards: The Authentication Solution for the E-business User; pp. 12-15, Dated Apr. 1, 2001.
Sarma, Radio-Frequency Identification: Security Risks and Challenges (RSA Laboratories Cryptobytes vol. 6, No. 1); 9 pages, Dated 2003.
Smart Card Alliance, Contactless Technology for Secure Physical Access: Technology and Standards Choices, Oct. 2002; 36 pages.
Juels, Squealing Euros: Privacy Protection in RFID-Enabled Banknotes (FC 2003, LNCS 2742, pp. 103-121).
Juels, The Blocker Tag: Selective Blocking of RFID Tags for Consumer Privacy (CCS'03); pp. 103-111, Dated Oct. 2003.
Sakamura, The Etron Wide-Area Distributed-System Architecture for E-Commerce (IEEE 2001); pp. 7-12.
Sarma, RFID Systems and Security and Privacy Implications (CHES 2002, LNCS 2523, pp. 454-469, 2003).
Weis, Security and Privacy Aspects of Low-Cost Radio Frequency Identification Systems (Security in Pervasive Computing 2003, LNCS 2802, pp. 201-212, 2004).
European Search Report directed to European Patent Application No. 04023384.3, mailed Jan. 3, 2005; 3 pages.
European Search Report directed to European Patent Application No. 14002578.4, mailed Oct. 30, 2014; 3 pages.

* cited by examiner

SYSTEM AND METHOD FOR AUTHENTICATION VIA A PROXIMATE DEVICE

CROSS-REFERENCE TO RELATED APPLICATION(S)

This application is a continuation of U.S. patent application Ser. No. 11/204,596, filed Aug. 15, 2005, which claims the benefit of U.S. Provisional Patent Application No. 60/637,668, filed Dec. 20, 2004, the disclosure of which is hereby incorporated by reference herein.

TECHNICAL FIELD

This application relates to data processing and, more specifically, to a system and method of authenticating devices via at least one proximate device.

BACKGROUND

A variety of services may be accessed using computing devices such as personal computers and wireless handsets. For example, a user may access data stored on or applications running on the computing device. In addition, a user may connect to a data network to gain access to data and applications on remote servers.

In some cases, access to a service may be limited to authorized users. For example, a service may provide access to sensitive data such as financial information or personal information. In addition, access to a service may require payment of a fee.

A variety of techniques are known for securing access to services via a computing device. For example, a user may be required to present some form of credential to a computing device that provides the service (the "service provider"). Here, the credential may indicate that a particular user (or anyone who knows the credential) may access a given service. In some applications a credential may take the form of a user name and password that was provided to the user and the service provider by a system administrator. When the user accesses a service, the user may present the user name and password to the service provider. The service provider then verifies that this credential is assigned to an authorized user of the requested service.

In a typical data network, access to the data network is limited to devices that have been properly installed on the network. As part of this installation, cryptographic techniques may be employed to ensure that only authorized devices are connected to the network. In general, cryptographic techniques may include one or more of encryption, decryption, authentication, signing and verification.

For example, a network administrator may load one or more cryptographic keys (hereafter "key(s)") into each device that is authorized to connect to the network. The network administrator also loads corresponding keys into a network access device (e.g., a router) that is connected to, for example, a wide area network ("WAN"). When the device attempts to access the network, the network access device verifies that a proper key has been loaded into that device. Once verified, the network access device enables the requesting device access to the network.

In practice, the process of authorizing a user to use a service and installing devices on a network may be relatively cumbersome and time consuming. As described above, these operations tend to be relatively manual in nature. However, distributed computing services are becoming increasingly prevalent and affordable to access. For example, the proliferation of wireless computing networks and handheld devices enables a user to use a variety of devices to access a variety of different networks that may exist throughout a city, etc. Accordingly, a need exists for more efficient techniques for enabling a user to access secured services.

Moreover, conventional methods of entering or loading a credential or a cryptographic key into a device may be compromised in some circumstances. For example, when a user uses a computing device to access a secured service, the user may first need to enter the credential into the computing device. Typically, this is accomplished using an input device such as a keyboard. The computing device may then forward these credentials to a service provider that determines whether the user is authorized to use the requested service.

In the event the computing device has been comprised by a hacker or a computer virus, an unauthorized person may gain access to these credentials. For example, a personal computer may incorporate a trusted computing module ("TPM") to control access to certain secured services (e.g., access to an encrypted data file or a secured network). Here, the TPM may require a user to enter a password or other credential before the TPM allows the user to access these services. If the user uses a keyboard to enter this information, the password may be routed through the personal computer from the keyboard to the TPM via an insecure path. For example, the keyboard may connect to a USB port and a software driver may be used to transfer the data from the USB bus to a TPM that, for example, is connected to a South Bridge of the personal computer. However, the hacker or virus may be able to access data that is forwarded and/or stored by the software driver. As a result, an unauthorized person may acquire the password and gain access to the secured service.

Similarly, secret key information used in wireless devices may be compromised. For example, to enable secure communication between two Bluetooth devices, complementary keys may need to be loaded into each device. In some applications, a key is transferred from one Bluetooth device to the other Bluetooth device via the Bluetooth network. However, an unauthorized person may be able to intercept the broadcast Bluetooth signal containing the key. As a result an unauthorized person may acquire the key and gain access to secured services.

Serious consequences may result when the secured services control and provide access to sensitive information such as financial data or personal information. Accordingly, a need exists for more secure techniques for providing access to secured services.

SUMMARY

The invention relates to a system and method for authenticating a user or users to use one or more devices in a communication system. For convenience, an embodiment of a system constructed or a method practiced according to the invention may be referred to herein simply as an "embodiment."

In one aspect the invention relates to authenticating a user to access a service provided by or accessible via an access device (e.g., a computing device). For example, the user may access data stored on the access device or on a remote computing device. The user also may access applications running on the access device or on remote servers. In addition the user may gain access to a data network via the access device.

In one aspect of the invention, credentials for gaining access to the service are provided to an input device that is proximate the access device. Cryptographic techniques may then be used to authenticate and/or protect the credentials.

In some embodiments, a secure communication mechanism may be established between the input device and the access device for transmission of the credentials. For example, a user may initially provide the credentials to the input device in a secure manner. In some embodiments this may include entering the credentials into a security boundary in the input device. A cryptographic processing component in the input device may then cryptographically encrypt and/or sign the credentials within the security boundary. Here, the authenticity of the signing/encrypting may be verified to the access device by a published digital certificate. The input device then provides the signed/encrypted credentials to the access device.

The access device may then provide the credentials to a service provider to gain access to a service. In some embodiments, a secure communication mechanism may be established between the access device and the service provider. For example, a cryptographic processing component in the access device may cryptographically encrypt and/or sign the credentials within a security boundary. Here, the authenticity of the signing/encrypting may be verified to third parties (e.g., a service provider) by a published digital certificate. The access device then provides the sighed/encrypted credentials to a service provider.

The service provider may validate that the credentials originate from a specific access device. For example, a cryptographic processor in the service provider may use the access device's public key to cause the access device to prove that it has the corresponding private key. In addition, since the service provider has access to a certificate for the public key, assurance may be provided that the access device has a mechanism for protecting keys and that the private key of the access device was not exposed outside of the security boundary. Consequently, a high level of assurance that the credentials came from a specific and/or trusted access device that is currently being used by an authorized user (as authenticated by the cryptographic processing in the input device) may be provided to the service provider.

In some embodiments authentication may be used to verify that a user is in the proximity of the access device. For example, an authorized user may be provided access to a service only when a wireless token assigned to the user is in the proximity of the input device which in turn is in relative proximity to the access device through which access to the secured service is obtained. In this way, a reasonable assumption may be made that the authorized user is in fact using a specific access device to request the service.

In some embodiments an input sensor is implemented within a security boundary on the input device. In this way, the credential may be passed via the input sensor directly to the security boundary of the input device then passed securely to the access device. As a result, the credentials may be passed to the access device without being routed via software messages or applications. As a result, the credentials may not be intercepted by a hacker or computer virus that may have compromised the software executing on the access device.

In some embodiments the input device comprises a proximity authentication system such an RFID system. For example, a user's credentials may be stored on an RFID token and the input device may include an RFID reader. In this case, the RFID reader reads the credentials when the RFID token is proximate the input device.

In some embodiments the input device may comprise a biometric sensor such as a fingerprint reader. In this case, the credentials may include biometric information (e.g., a scan of a fingerprint).

BRIEF DESCRIPTION OF THE DRAWINGS

These and other features, aspects and advantages of the present invention will be more fully understood when considered with respect to the following detailed description, appended claims and accompanying drawings, wherein:

Figure 1:
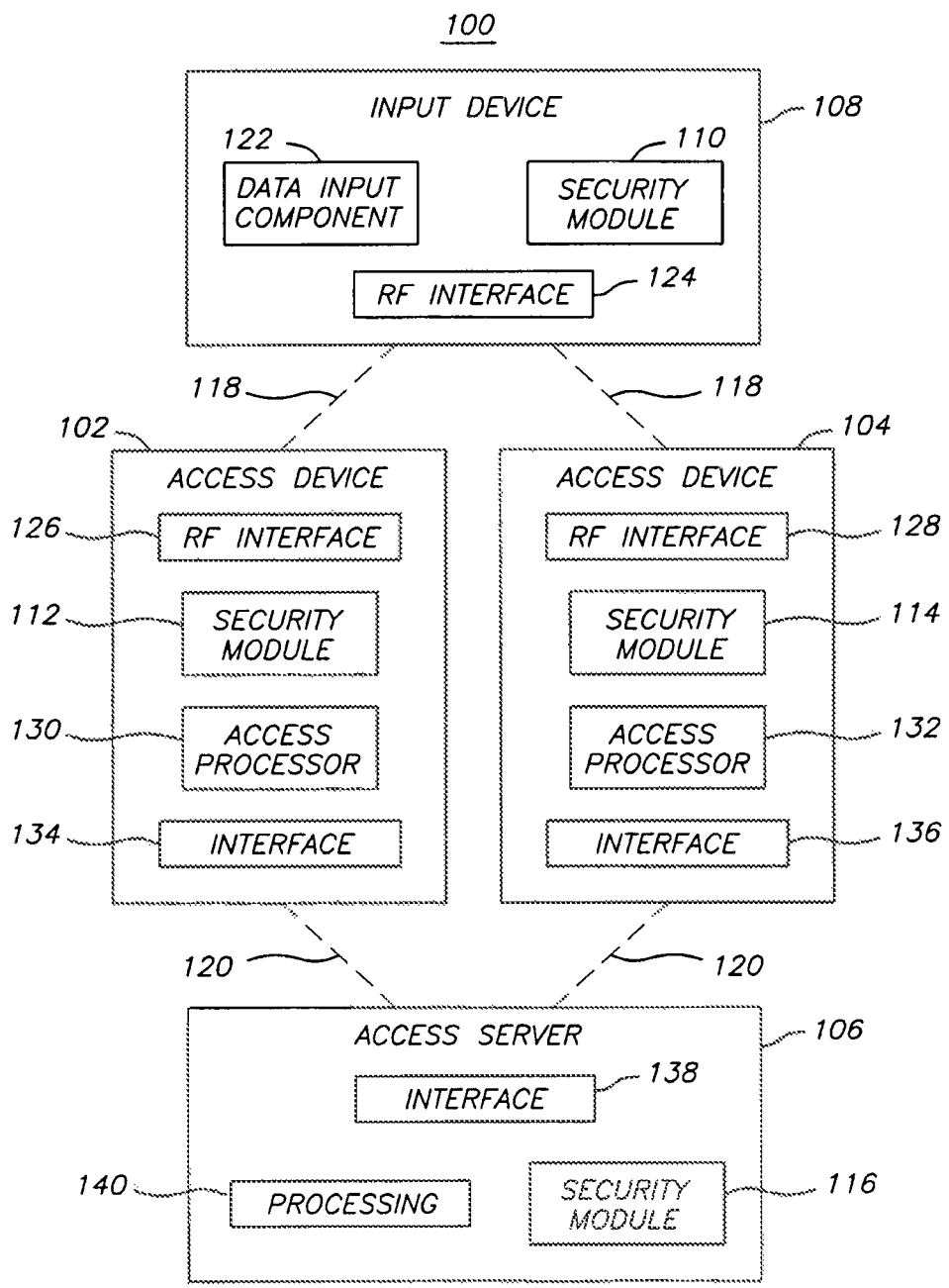
FIG. 1 is a simplified block diagram of one embodiment of an authentication system constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

In one aspect, the invention relates to systems and methods that provide device and/or user level authentication. For example, various techniques are described for authenticating that a user is using a device. In addition, various techniques are described for authenticating a device to a service such as enabling access to a data network.

In a conventional data network device level authentication may be used to ensure that only authorized devices are allowed to connect to the network. Here, cryptographic techniques may be employed to authenticate that a device that is attempting to connect to the network is the device it purports to be and is authorized to use the network. For example, a device typically connects to the network via an access point such as a router. Compatible cryptographic keys are thus provided to the router and to authorized devices to enable these devices to perform cryptographic operations that provide the desired authentication. In such a network, a mechanism must be provided for securely distributing keys to all devices that may connect to the network. Traditionally, this has been accomplished by the user or a network administrator manually loading the keys into the devices (e.g., via a keyboard or a software program).

Such device level authentication may have a number of drawbacks. For example, there may not be any verification as to which user is using the device. Moreover, when multiple users use the same device, there may not be an efficient mechanism to determine which verification information (e.g., cryptographic certificate) should be used to authenticate to the system.

FIG. 1 illustrates one embodiment of a system 100 constructed in accordance with the invention where one or more users (not shown) may use one or more access devices 102 and 104 to access services (e.g., connect to a data network) via an access server 106. For example, to access a service a user presents authentication information (e.g., credentials such as a password) to an input device 108. For convenience the term "credential(s)" may be used to refer generally to any type of information that a user may present for authentication purposes.

The input device 108 may include a security processing component (e.g., a security module 110, a processor with code for cryptographic operations, etc.) that provides cryptographic processing and may incorporate other security mechanisms. For example, the security module 110 may include one or more cryptographic processors that perform cryptographic operations such as encryption, decryption, authentication, verification and signing. Using the security module 110, the input device 108 may authenticate the credentials received from the user. The input device 108 may then securely send the credentials via an interface (e.g., an RF interface 124) to an access device 102 or 104 via signals 118 through a medium (e.g., a wireless medium).

The access device 102 or 104 includes an interface (e.g., RF interface 126 or 128) for receiving the signals 118. The access device 102 or 104 includes some form of processing (e.g., access processor 130 or 132) for accessing a service. For example, in some embodiments the access processor may comprise a processor for a cell phone or some other form of wireless device.

The access device 102 or 104 also may include a security processing component (e.g., security module 112 or 114) that provides cryptographic processing and may incorporate other security mechanisms. For example, a security module may include one or more cryptographic processors that perform cryptographic operations such as encryption, decryption, authentication, verification and signing. Using the security module, an access device 102 or 104 may authenticate the credentials received from the input device 108. The access device may then securely send the credentials via an interface (e.g., interface 134 or 136) to the access server 106 via signals 120 over a medium (e.g., a wireless medium).

The access server 106 includes an interface (e.g., interface 138) for receiving the signals 120. The access server includes some form of processing 140 for providing access to a service. For example, in some embodiments the access processor may comprise a network server for a wired and/or wireless network.

The access server 106 also may include a security processing component (e.g., security module 116, a key manager, etc.) that provides cryptographic processing and may incorporate other security mechanisms. Here, the security module 116 may process the received credentials to, for example, authenticate and/or decrypt the credentials. The above architecture may thus provide relatively strong authentication to the access server 106 that the credentials have been presented to a trusted input device 108 that is associated with a trusted access device 102 or 104. As a result, the access server 106 may enable the access device 102 or 104 to access the requested service.

Figure 2:
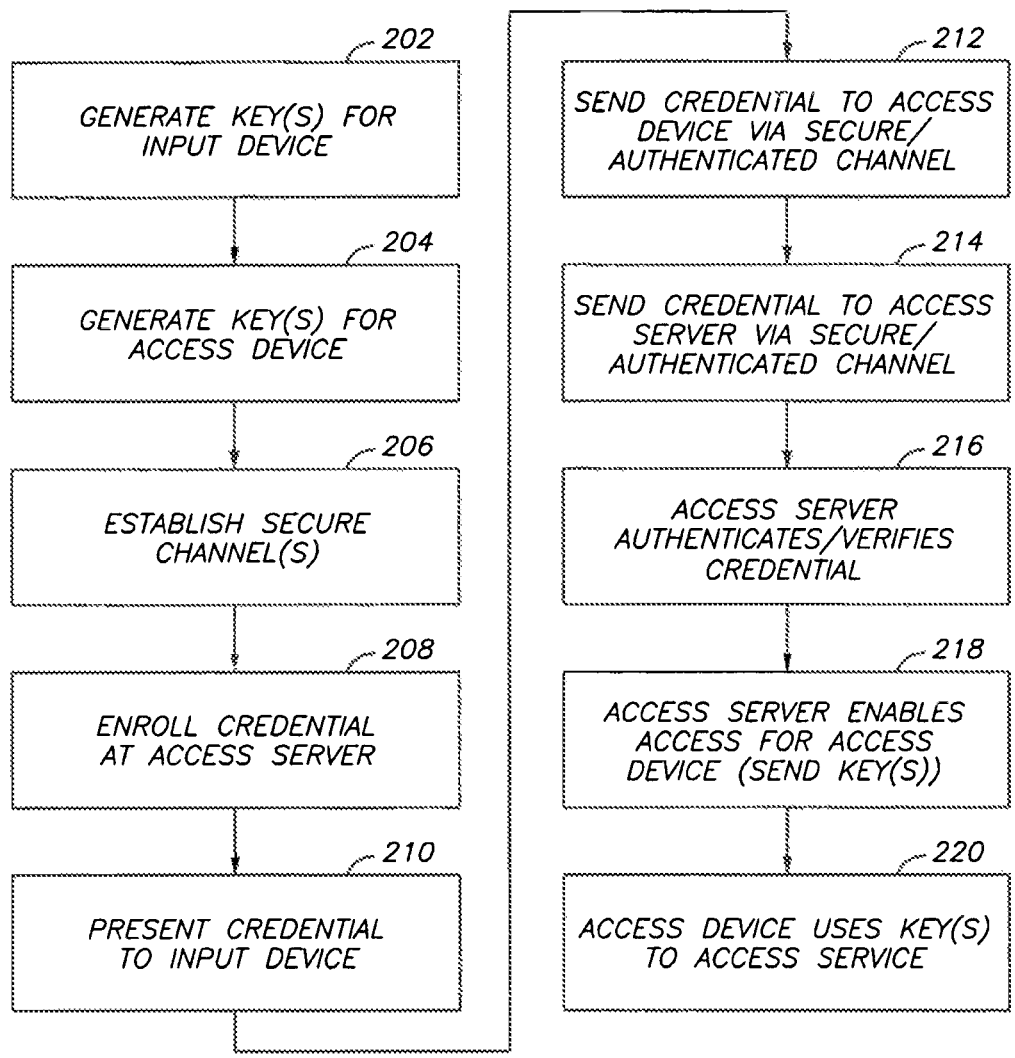
FIG. 2 is a flow chart of one embodiment of authentication operations that may be performed in accordance with the invention.

Selected operations of the system 100 will be explained in more detail in conjunction with the flowchart of FIG. 2. As represented by block 202, one or more keys may be generated to enable the input device 108 to securely communicate with an access device (e.g., access device 102). In some embodiments, this is accomplished through the use of asymmetric keys.

For example, a unique asymmetric identity key may be provided for the input device 108 during manufacture or at some later time. The private key portion of this asymmetric key may be stored within a security boundary (e.g., the security module 110) in the input device 108. For example, a processor (e.g., a multi-purpose processor or a cryptographic processor) may generate the key within this security boundary and the private portion of the key may never be allowed to appear outside of the security boundary in the clear (i.e., unencrypted). Additional details of a security boundary are provided below.

The public portion of the key may then be published with a digital certificate. For example, the manufacturer of the input device may publish the public key and the certificate on a publicly accessible server. The certificate may serve to verify that the public key is authentic, that the private key has not been disclosed outside the security boundary and that the input device that holds the private key provides a mechanism to securely receive, use and maintain keys. Thus, the certificate serves to strongly verify the authenticity of any information provided by an input device that has the corresponding private key.

In some embodiments, the input device and the access device may use the asymmetric key to negotiate one or more other keys that may be used for cryptographic processing. For example, these other keys may be used to encrypt, decrypt, sign, etc., information send between these components. In this way, an authenticated and/or secure channel may be established between the input device and the access device. That is, each component will have one or more keys that enable it to encrypt, decrypt or authenticate information that it sends to or receives from the other component. In this way, sensitive information (e.g., credentials or keys) may be securely sent over a link 118 (e.g., a wireless link such as Bluetooth, etc.) that may not otherwise be secure.

Referring now to block 204, keys also may be generated for the security module in the access device during manufacture or at some later time. Thus, a unique asymmetric identity key may be provided for the access device 102. The private key portion of this asymmetric key may be stored within a security boundary (e.g., the security module 112) in the access device 102. The public portion of the key may then be published with a digital certificate that may serve to verify that the public key is authentic, that the private key has not been disclosed outside the security boundary and that the access device that holds the private key provides a mechanism to securely receive, use and maintain keys. Thus, the certificate serves to strongly verify the trustworthiness of the access device. This asymmetric key pair may then be used to establish an authenticated and/or secure channel between the access device and the access server or some other device.

Referring now to block 206, once the devices are installed in the field, the devices and the access server may establish secure channels over media that may otherwise be insecure. In some embodiments this may involve performing asymmetric key exchange operations.

At block 208, to enable the access server to recognize the credentials assigned to a given user, the credentials are enrolled (e.g., entered into) the access server. This may be accomplished, for example, using a credential enrollment mechanism. Additional details of various credential enrollment mechanisms are discussed below.

The credential enrollment mechanism provides the credential information to the security module 116 which may then generate one or more keys associated with that credential. These keys may comprise, for example, SSL or IPsec keys/security associations that may enable the user to log onto a security network.

Referring to block 210, when a user wishes to access a service via the access device 102, the user presents his or her credentials to a data input component 122 on the input device 108. The data input component may comprise a keypad, an RFID reader, a sensor, etc.

In some embodiments the input device 108 is a biometric sensor. For example, the sensor may comprise a fingerprint reader. Alternatively, the sensor may comprise a retina/iris scanner, an audio input device (e.g., a microphone) for speech recognition, a camera sensor (e.g., a CCD device) for, e.g., facial feature recognition or a DNA typing device. In addition, appropriate processing may be provided on the sensor integrated circuit to facilitate retrieval and analysis of this information.

In some embodiments credentials may be provided to the input device via a direct path into the security boundary of the input device. For example, credentials may be directly entered into a device located within a security boundary. This may be accomplished, for example, using a keyboard, an RFID reader, a biometric sensor, etc., that is physically attached to a component within the security boundary. Additional details of these types of components are discussed below.

Referring to block 212, the input device 108 sends the credentials to the access device 102 via the authenticated and/or secure channel discussed above. For example, a cryptographic processor in the input device may use a key obtained from the negotiation with the access device 102 discussed above to sign and/or encrypt the credentials. Typically, the cryptographic processor signs the credentials using such a key or the private key of the input device.

Referring to block 214, the access device 102 processes the credentials, as necessary, and sends the credentials to the access server 106 via the authenticated and/or secure channel 120 discussed above. For example, a cryptographic processor in the access device 102 may use a key obtained from the negotiation with the access server 106 discussed above to encrypt the credentials. Typically, the cryptographic processor signs the credentials using such a key or the private key of the access device 102.

At block 216, cryptographic processor(s) in the access server 106 process the encrypted/signed credentials. Through this cryptographic process, the access server obtains strong authentication that the credentials are from a user that is using a specific access device 102. Moreover, assurances may be made via the certificate that the input device (e.g., keyboard, sensor, RFID components, etc.) through which a user inputs credentials is proximate to that access device.

The access server 106 then checks the credential database to verify that the credentials are associated with an authorized user. If so, the access server 106 generates or retrieves the key (e.g., key A) that corresponds to that credential or otherwise enables access to a requested service. The access server may then, for example, send the key to the access device 102 (block 218). Typically, the cryptographic processor 124 will encrypt the key to protect it during transmission. Here, the cryptographic processor may use a negotiated key or the public key associated with the private key to encrypt key A.

Once the access device 102 receives encrypted key A, the cryptographic processor decrypts key A and uses it to, for example, establish a connection with a network (block 220).

Figure 3:
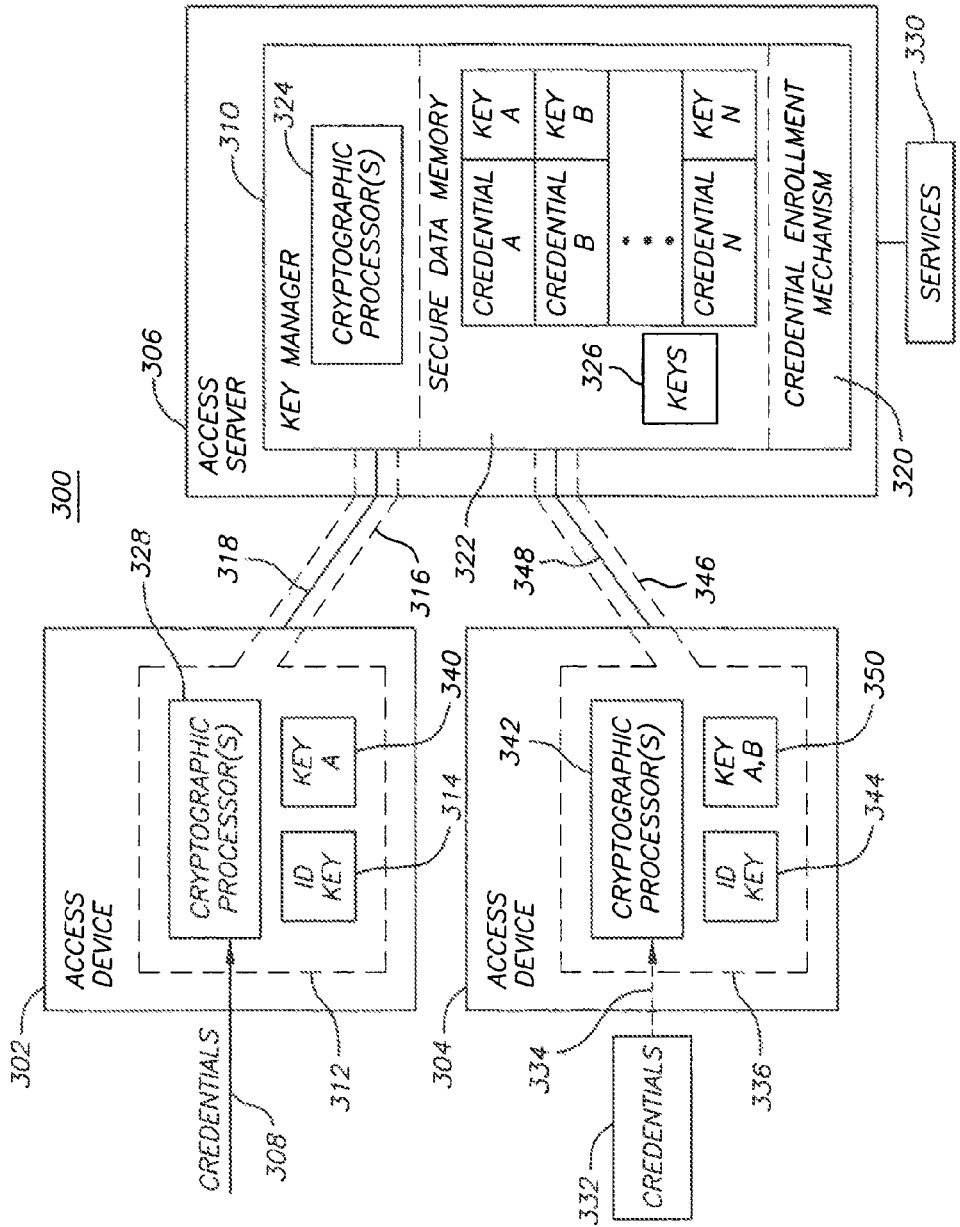
FIG. 3 is a simplified block diagram of one embodiment of a user authentication system constructed in accordance with the invention.

Referring now to FIG. 3 additional details of the authentication process will be discussed. FIG. 3 illustrates one embodiment of a system 300 constructed in accordance with the invention where one or more users (not shown) may use one or more access devices 302 and 304 to access services 330 (e.g., connect to a data network) via an access server 306. For example, to access a service a user presents authentication information (e.g., credentials 308 such as a password) to the access device 302 via a proximate input device (not shown). For convenience the term "credential(s)" may be used to refer generally to any type of information that a user may present for authentication purposes.

The access device 302 may include a security module that provides cryptographic processing and may incorporate other security mechanisms. For example, a security module may include one or more cryptographic processors 328 that perform cryptographic operations such as encryption, decryption, authentication, verification and signing. Using the security module, the access device 302 may authenticate the credentials received from the input device and securely send the credentials to a key manager 310 in the access server 306.

The key manager 310 provides a secure environment for generating, assigning and maintaining keys that are used in the system. The key manager includes one or more cryptographic processors 324 for securely performing cryptographic operations including encryption, decryption, authentication, etc. The key manager also includes a secure data memory 322 for storing keys 326 in a manner that prevents the keys from being accessed by unauthorized persons or methods.

To provide secure processing and key storage a security boundary, is associated with and enforced by the key manager. This security boundary may be established, for example, using hardware and/or cryptographic techniques.

Hardware techniques for providing a security boundary may include, for example, placing components within a single integrated circuit. In addition, one or more integrated circuits may be protected by a physical structure using tamper evident and/or tamper resistant techniques such as epoxy encapsulation.

Encryption techniques for establishing a security boundary may include, for example, encrypting any sensitive information before it leaves the key manager. For this purpose, the key manager may use one or more of the cryptographic processors 324 and store the associated encryption/decryption keys 326 in an internal secure data memory 322.

To maintain the security of the system 300, any keys distributed by the key manager to other components in the system should be adequately protected. For example, provisions may be made to ensure that keys are only delivered to authorized devices. In addition, provisions may be made to protect the keys during distribution and within the recipient devices.

In some embodiments the access device 302 includes one or more cryptographic processors 328 and keys (e.g., key 314) to authenticate information that is sent from the access device 302 to the access server 306, to facilitate secure transmission of keys to the access device 302, and to protect the keys used by the access device 302.

For example, using digital certificates and other cryptographic processes the access device 302 may provide strong authentication to the access server 306 that the credentials it sends to the access server 306 are from a user that is using that specific access device. In addition, these processes may be used to verify that the access device 302 provides a high level of protection for key material.

Once this authentication is provided to the access server 306, the key manager 310 may safely distribute keys to the access device 302 to facilitate access to the desired service. For example, the key manager may distribute keys to the access device to enable the access device to connect to a data network.

The embodiment of FIG. 3 provides an efficient mechanism that enables a user to, for example, use a variety of access devices to gain access to a network. Here, the user initially authenticates himself or herself to each device. The access server then automatically builds the network by distributing the necessary keys to each device. As described herein this process may be accomplished with a high level of security. Moreover, since the access server provides the appropriate keys to each device, the key material does not need to be given to the user. In addition, the user may not be required to, for example, provide a digital certificate to each access device he or she uses in the network.

Figure 4:
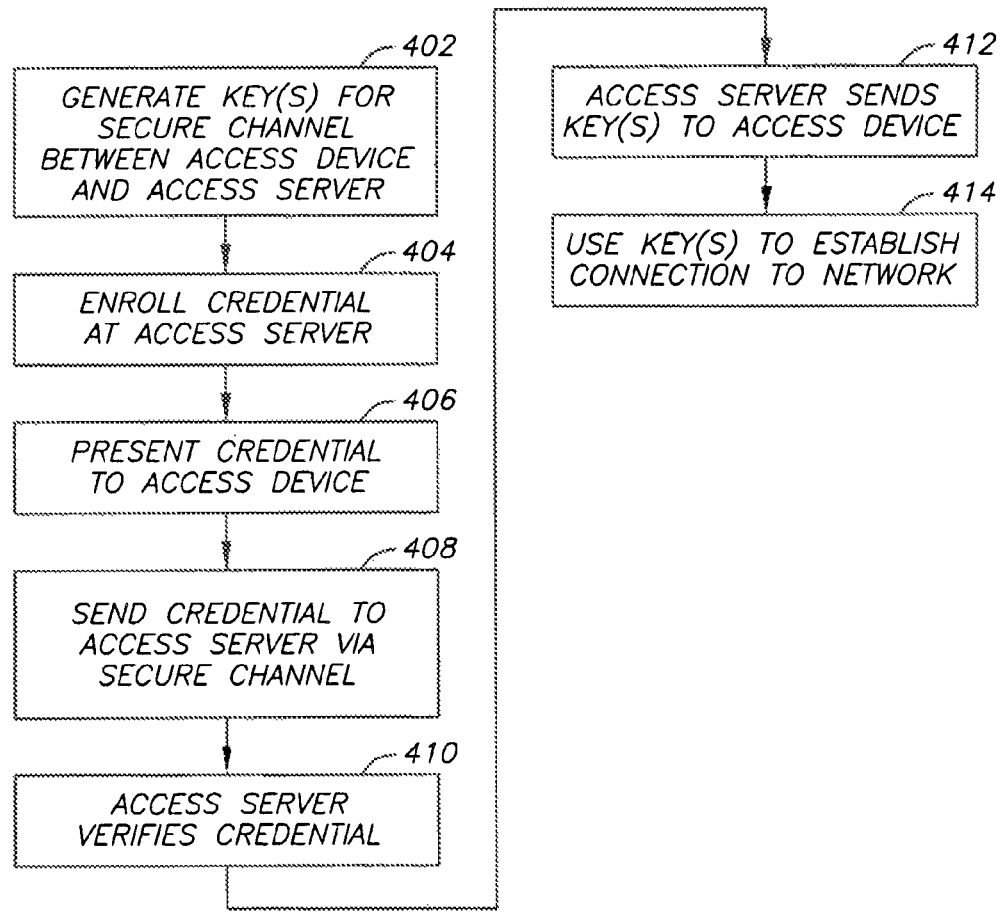
FIG. 4 is a flow chart of one embodiment of user authentication operations that may be performed in accordance with the invention.

Selected operations of the system 300 will be explained in more detail in conjunction with the flowchart of FIG. 4. As represented by block 402, one or more keys may be generated to enable the access device to securely communicate with the access server. In some embodiments, this is accomplished through the use of asymmetric keys.

For example, a unique asymmetric identity key 314 may be provided for each access device. The private key portion of this asymmetric key may be stored within a security boundary (represented by dashed line 312) in the access device. For example, a cryptographic processor 328 may generate the key within this security boundary and the private portion of the key may never be allowed to appear outside of the security boundary 312 in the clear (i.e., unencrypted). Additional details of a security boundary are provided below.

The public portion of the key may then be published with a digital certificate. For example, the manufacturer of the access device may publish the public key and the certificate on a publicly accessible server. The certificate serves to verify that the public key is authentic, that the private key has not been disclosed outside the security boundary and that the access device that holds the private key provides a mechanism to securely receive, use and maintain keys. Thus, the certificate serves to strongly verify the authenticity of any information provided by an access device that has the corresponding private key.

In some embodiments, the access device and the access server may use the asymmetric key to negotiate one or more other keys that may be used for cryptographic processing. For example, these other keys may be used to encrypt, decrypt, sign, etc., information send between these components. In this way, a secure channel (represented by dashed lines 316) may be established between the access device and the access server. That is, each component will have one or more keys that enable it to decrypt encrypted information that it received from the other component. In this way, sensitive information (e.g., keys) may be securely sent over a link 318 that may not otherwise be secure.

Referring now to block 404, to enable the access server to recognize the credentials assigned to a given user, the credentials are enrolled (e.g., entered into) the access server. This may be accomplished, for example, using a credential enrollment mechanism 320. In some embodiments the credential enrollment mechanism may comprise a keyboard and monitor console for the server. In some embodiments the credential enrollment mechanism 320 may be inside a security boundary associated with and enforced by the key manager 310. For example, the credential enrollment mechanism 320 may comprise a keyboard that is physically attached to the key manager, an RFID reader, a biometric sensor, etc. Additional details of these types of components are discussed below.

The credential enrollment mechanism 320 provides the credential information to the key manager 310 which may then generate one or more keys associated with that credential. These keys may comprise, for example, SSL or IPsec keys/security associations that may enable the user to log onto a security network. The key manager may then maintain a database that associates each authorized user's credential (e.g., credential A) with key(s) and certificate(s) (e.g., key A) that may be generated for that user.

The credentials and the associated key(s) may be stored in a secure data memory 322. In some embodiments the data memory 322 may be protected within a physical security boundary of the key manager 310. For example, the database 322 may be located within a secure enclosure and/or within the same integrated circuit as the key manager. In some embodiments the data memory 322 may be located external to the key manager. In this case, however, the key manager may encrypt the keys before they are stored in the data memory.

Referring to block 406, when a user wishes to access a service via the access device 302, the user presents his or her credentials 308 to the access device. As discussed above, the credentials 308 are provided to the access device via a proximate input device.

In some embodiments credentials may be provided from the input device to the access device via a direct path into the security boundary of the access device. For example, in the access device 304 credentials 332 may be directly entered (as represented by dashed line 334) into a device located within a security boundary 336. This may be accomplished, for example, using a wireless interface that is physically attached to a component within the security boundary.

Referring to block 408, the access device 302 sends the credentials 308 to the access server 306 via the secure channel 316 discussed above. For example, a cryptographic processor 328 may use a key obtained from the negotiation with the access server 306 discussed above to encrypt the credentials. Typically, the cryptographic processor(s) 328 sign the credentials using such a key or the private key 314.

At block 410, cryptographic processor(s) 324 in the access server 306 process the encrypted/signed credentials. Through this cryptographic process, the access server obtains strong authentication that the credentials are from a user that is using a specific access device 302. Moreover, assurances may be made via the certificate that an input device (e.g., keyboard, sensor, RFID components, etc.) through which a user inputs credentials is proximate to that access device.

The access server 306 then checks the credential database to verify that the credentials are associated with an authorized user. For example, the access server may determine whether the credential matches a credential (e.g., credential A) stored in the data memory 322.

If so, the access server 306 generates or retrieves the key (e.g., key A) that corresponds to that credential. The access server then sends the key to the access device 302 (block 412). Typically, the cryptographic processor 324 will encrypt the key to protect it during transmission. Here, the cryptographic processor may use a negotiated key or the public key associated with the private key 314 to encrypt key A.

Once the access device 302 receives encrypted key A, the cryptographic processor 328 decrypts the key and stores decrypted key A 340 within the security boundary 312. Here, the cryptographic processor 328 may use a negotiated key or the private key 314 to decrypt key A. The access device 302 may then use key A 340 to, for example, establish a connection with a network (block 414).

If desired, the user may then use another access device (e.g., access device 304) to access the network. Again, the user presents his or her credentials (e.g., the same credentials referred to above) to access device 304 via the input device (not shown). Cryptographic processor(s) 342 may then encrypt/sign the credentials and send them to the access server via a secure channel 346 over a link 348 that may not otherwise be secure. Again, an asymmetric identity key 344 may be used to establish the secure channel 346, form the basis of a digital certificate, sign credentials, etc. The access server 306 then verifies the credentials. Here, since the access server has received the same credentials it may assume that the same user has authenticated to the access device 304. Accordingly, the access server sends the same key (e.g., key A) to the access device 304 via the secure channel 346, thereby binding these access devices together. The cryptographic processor 342 decrypts encrypted key A and stores decrypted key A 350 within the security boundary. Access device 304 may then use key A to connect to a network or access another service.

In addition, more than one set of credentials may be presented to a given access device to access a network. For example, multiple users that are assigned different credentials may share an access device. In addition, the same user may have different credentials that provide access to different services such as personal services or employer provided services. Accordingly, another set of credentials may be stored in the access server database and associated with a unique key (e.g., key B). When these other credentials are presented to the access device 304, the key B will be provided to the access device 304 using the secure techniques discussed above. Accordingly, access device may use the key B 350 to establish a separate, cryptographically secure connection to a network.

Figure 5:
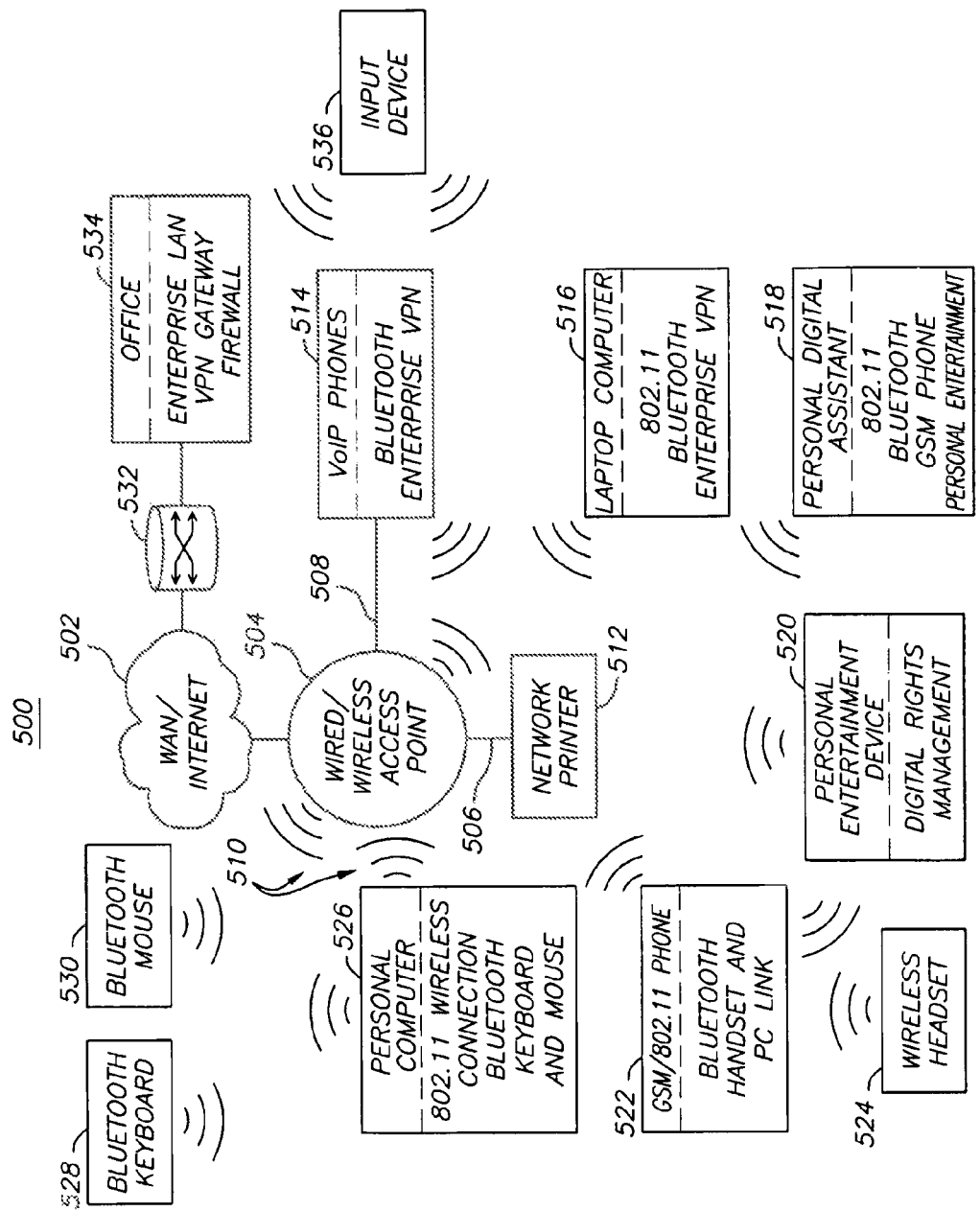
FIG. 5 is a simplified block diagram of one embodiment of a user authentication system constructed in accordance with the invention.

These aspects of the invention will be described in more detail in conjunction with FIGS. 5 and 6. FIG. 5 is a simplified diagram of one embodiment of a network system that may support a variety of communication and data processing devices.

In FIG. 5 access devices connect to a wide area network ("WAN") 502 such as the Internet via an access point (e.g., a router) 504. Here, the access point may serve as the access server discussed herein. Alternatively, the access point 504 may connect to an access server (not shown) such that the credentials and keys pass through the access point as they are sent between the access server and the access devices. In either case, credentials for any users that are authorized to access the system may be enrolled with the access server.

The access point 504 may provide connectivity for wired or wireless devices. For example, a network printer 512 may be connected to the access point by a wired connection as represented by line 506. A voice-over-Internet-Protocol ("VoIP") phone 514 also may connect to the access point via a wired connection as represented by line 508.

Other devices may connect to the access point via radio frequency ("RF") signals as represented, for example, by the curved lines 510. Here, the access point 504 may support wireless standards such as Bluetooth, 802.11, GSM, etc.

Examples of access devices include a VoIP phone 514 that supports the Bluetooth protocol; a laptop computer 516 that supports 802.11 and/or Bluetooth; a personal digital assistant ("PDA") 518 that supports 802.11 and/or Bluetooth and may include a cellular telephone that supports, for example GSM; a personal entertainment device 520; a phone 522 that supports GSM and/or 802.11 and that communicates with peripherals such as a wireless headset 524 via Bluetooth; and a personal computer 526 that supports an 802.11 wireless connection and that communicates with wireless peripherals such as a Bluetooth-enabled keyboard 528 and mouse 530.

As discussed herein, each of the devices 512-530 may include a security module (not shown) that enables the device to securely and efficiently receive any keys necessary to connect to the data network 502 and/or to other devices. In the latter case, for example, keys may be securely distributed between devices to enable a peripheral (e.g., keyboard 528) to securely communicate with a base device (e.g., computer 526). Accordingly, users may connect any of these devices to the network or other devices by simply providing their credentials to one or more input devices 536 which then route the credentials to the device(s) as discussed herein. For example, an input device 536 may communicate with a device 512-530 to provide a credential to a device 512-530. In the case of the peripherals (e.g., keyboard 528), the credentials may be passed through the base device (e.g., computer 526), then routed to the access server 504.

Additional details of the authentication components and processes that may be incorporated into these devices are described herein. For example, several embodiments for providing credentials to an access device or an access server are discussed below in conjunction with FIGS. 7-10. In addition, several embodiments of security modules are discussed below in conjunction with FIGS. 11-14.

Figure 6:
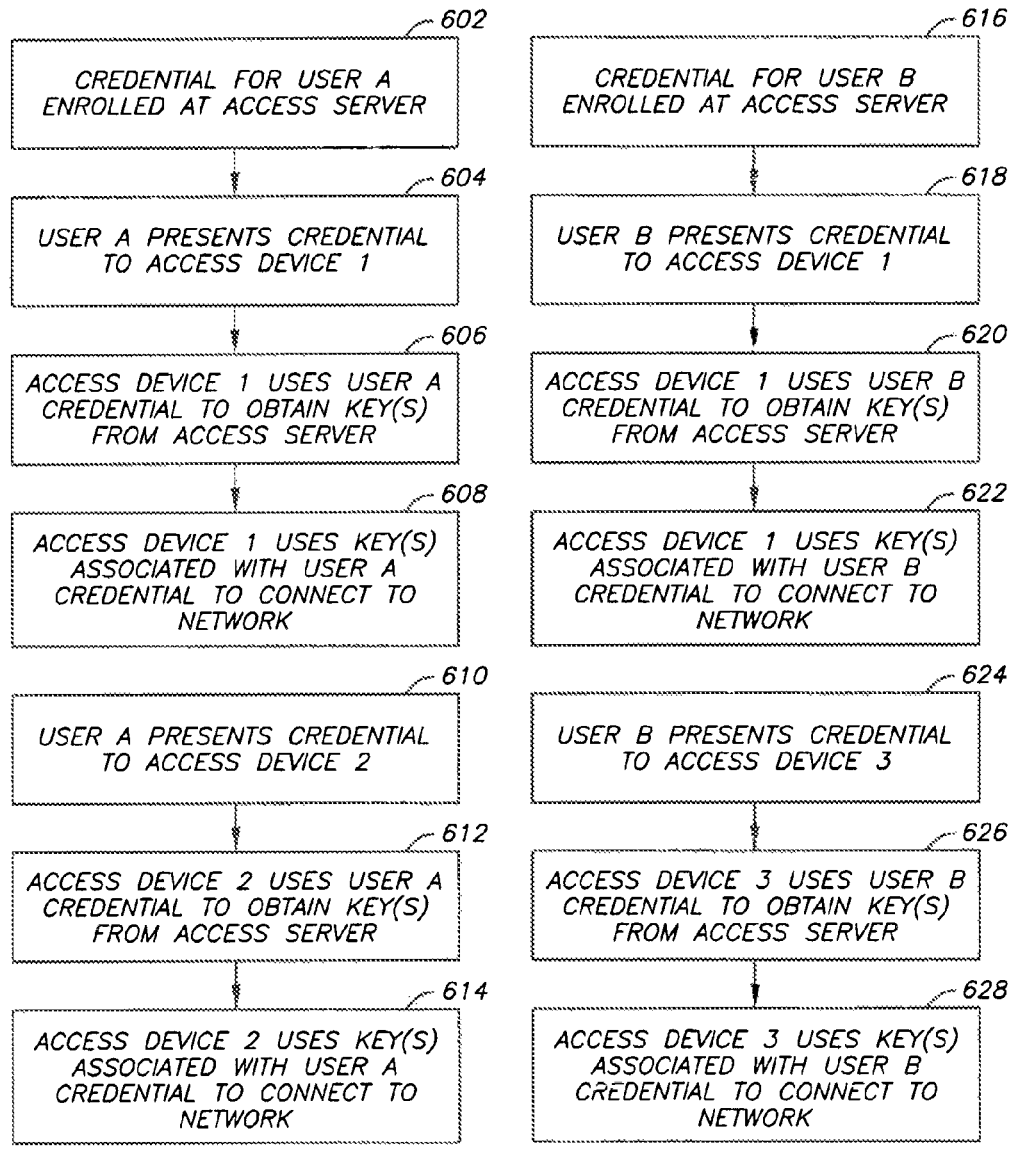
FIG. 6 is a flow chart of one embodiment of user authentication operations that may be performed in accordance with the invention.

Referring to FIG. 6, a simplified flowchart is illustrated relating to operations that may be performed in a network system (e.g., as shown in FIG. 5). For example, such a system may include multiple access devices and support multiple users and multiple levels of credentials. In general, these operations may be performed as discussed herein, for example, in conjunction with FIGS. 3 and 4. For convenience, not all of the operations involved in the process are illustrated in FIG. 6 or discussed below.

As represented by block 602, a credential for a user (referred to for convenience as "user A") is enrolled with the access server. At block 604, user A presents his or her credential to an input device that then sends the credential to an access device (referred to for convenience as "access device 1"). The access device 1 sends the credential to the access server and, after the access server verifies that the credential has been enrolled, the access server sends the associated key(s) to the access device 1 (block 606). Access device 1 may then use the key(s) associated with user A to connect to the network (block 608).

Blocks 610-614 illustrate that a network may be automatically built as a user provides his or her credentials to multiple access devices in the system. As represented by block 610, user A may provide his or her credential to another access device (referred to for convenience as "access device 2") via the input device. The access device 2 sends the credential to the access server and, after the access server verifies that the credential has been enrolled, the access server sends the associated key(s) to the access device 2 (block 612). Access device 2 may then use the key(s) associated with user A to connect to the network (block 614).

Blocks 616-622 illustrate that a given device may be used by several users to access the network. Here, each of the users may be assigned different credentials. As represented by block 616, a credential for another user (referred to for convenience as "user B") may be enrolled with the access server. At block 618, user B also may provide his or her credential to the access device 1 via the input device. The access device 1 sends the credential to the access server and, after the access server verifies that the credential has been enrolled, the access server sends the associated key(s) to the access device 1 (block 620). Access device 1 may then use the key(s) associated with user B to establish an entirely separate and cryptographically secure connection with the network (block 622).

In practice, the separate set of credentials identified above as being associated with user B may be a second set of credentials assigned to a given user (e.g., user A). For example, a user may have one set of credentials assigned for one network (e.g., a home network) and another set of credentials assigned for access to another network. Referring to FIG. 5, the devices 514 and 516 may be used to connect to an enterprise LAN at the user's office. In this case, the second set of credentials may be provided to the office network 534 via the WAN 502 and other routing mechanisms 532. Once the appropriate keys are exchanged, an enterprise virtual private network ("VPN") or other form of connection may be established between the access device and the office network 534. Again, this network may be entirely separate and cryptographically secured from any other network connections for that user or any other user of the system.

Blocks 624-628 illustrate that the network may be continued to be automatically built as other users provide his or her credentials to multiple access devices in the system. As represented by block 624, user B may provide his or her credential to another access device (referred to for convenience as "access device 3"). The access device 3 sends the credential to the access server and, after the access server verifies that the credential has been enrolled, the access server sends associated key(s) to the access device 3 (block 626). Access device 3 may then use the key(s) associated with user B to connect to the network (block 628).

The system described above may provide several advantages as compared to conventional systems. Traditional networks may only provide device level authentication that is achieved by manually configuring the head end and all devices that may connect to the network. For example, the router may be configured by an administrator physically connected to a LAN port of the router. Here, the administrator may enter in the keys for the router and identify each of the devices that may connect to the router. In addition, the administrator may manually configure each device in the network with the necessary key to enable the device to connect to that specific router.

In contrast, a network constructed using the teachings described herein may be automatically built by binding components (e.g., access devices) together as a user authenticates himself or herself to these components. This is facilitated, for example, by the ability to securely authenticate at the system level. For example, the proximity of the user may be verified as well as the ability of a security module to protect keys (e.g., using appropriate hardware).

A variety of secure techniques may be used to authenticate a user to a device. For example, a credential may be provided via a direct connection into an input device, credentials may be injected into a security boundary of a device via RFID signals or a sensor may be physically located within a security boundary of a device.

Here, the network may be built using digital certificates based on public/private keys pairs. This process may be initiated by using a private key that is protected on each component and may provide a secure environment where the components may dynamically change the keys.

In addition, each user does not need access to the keys that identify that user since the user does not need to pre-configure each device with the appropriate key. Instead the user may only present information such as a credential to obtain access to the network via a given device.

Moreover, a system may be configured to provide multiple networks. Each of these networks may include a given set of components that are defined for different users and/or for different permission levels for a given user. These networks may be secured from one another by using cryptographic techniques to authenticate access to each network and secure the data flowing though each network.

Referring now to FIGS. 7-10, several embodiments of mechanisms for providing credentials to a device will be discussed. In general, the following description describes providing credentials to an access device. However, these mechanisms also may be used to provide credentials to an access server or some other component in a system.

Figure 7:
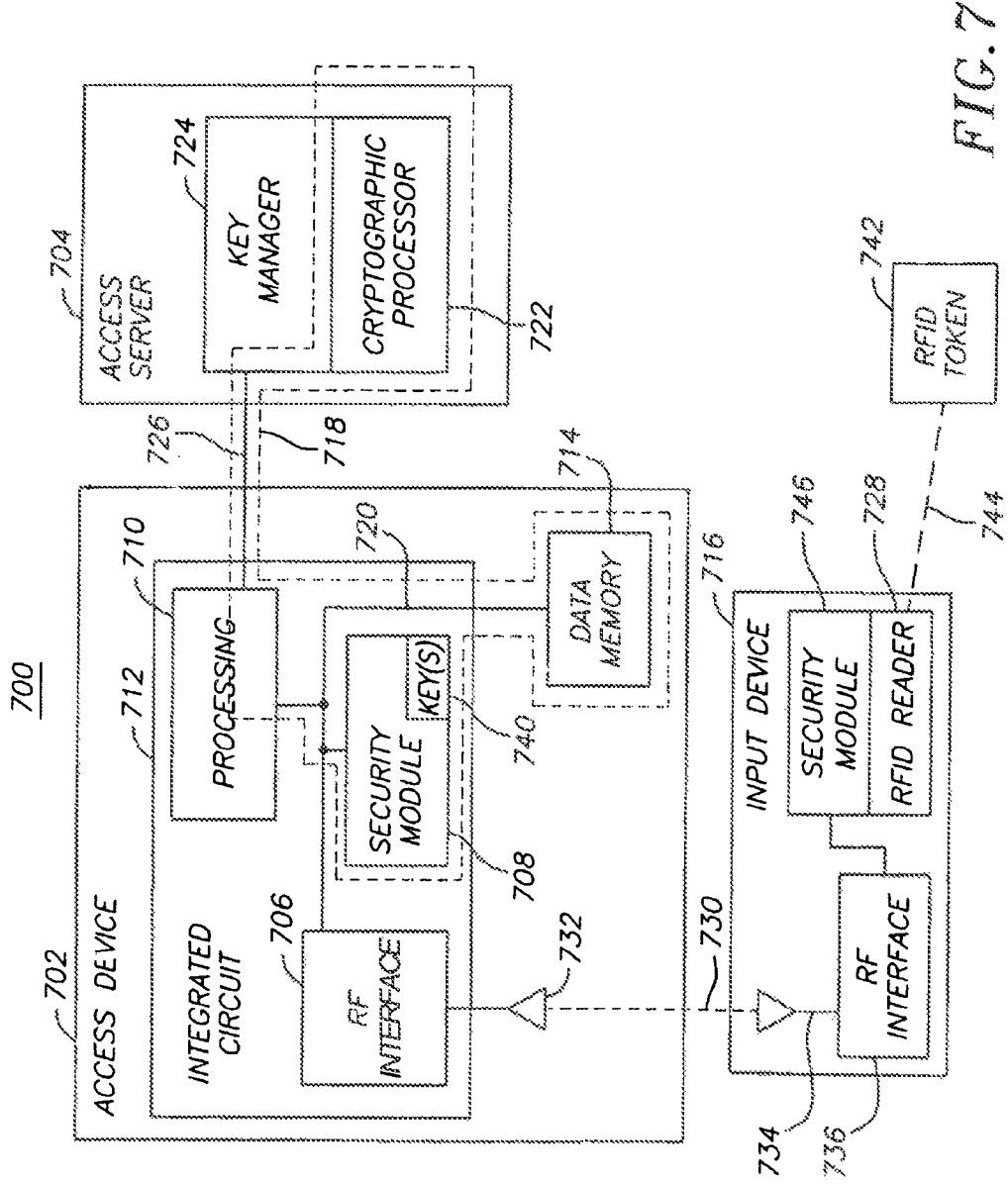
FIG. 7 is a simplified block diagram of one embodiment of a proximity-based authentication system constructed in accordance with the invention.

FIG. 7 illustrates one embodiment of a system 700 where selected services may be provided to a user via a computing device when a wireless token assigned to a user is proximate to the input device. An input device 716 includes components that may be used to determine whether a wireless token (e.g., an RFID token) 742 assigned to a user or users is proximate to the input device 716. For example, a wireless proximity reader (e.g., an RFID reader 728) may be configured to receive signals 744 (e.g., RF signals) from the wireless proximity token 742. The signals 744 may include information that uniquely identifies the wireless proximity token 742. For example, this information may include one or more credentials (e.g., a password) that may be used to access a secured service through an access server 704.

The determination of proximity between the token 742 and the reader 728 may be established using a variety of mechanisms depending on the application. In some embodiments, the token will not generate signals until it is within a given distance of the reader. This may be accomplished, for example, by using a relatively passive token that intercepts signals transmitted by the reader and transmits signals in response to the received signals. Different distances between the token 742 and the reader 728 may be defined as indicative of proximity depending on the requirements of the application and, in some cases, characteristics of the operating environment.

RF interfaces (e.g., Bluetooth interfaces) 736 and 706 and associated antennas 734 and 732 may then be used to send the credentials from the input device 716 to the access device 702 via RF signals 730. The RF interfaces also may be used for other communications between the input device 716 and the access device 702.

An access device 702 such as a computer may request access to a service from the access server 704 by sending a request over a communication link 726. Depending upon the particular application, the communication link 726 may comprise, for example, electric wires, optical cables or air. Thus, the access device 702 may support wired or wireless communications with the access server 704.

Typically, access to the service will be initiated by the user's interaction with the access device 702. For example, the user may use a keyboard or pointing device (e.g., a computer mouse) to access the service. In conjunction with this the user may be required to input a password and/or provide a biometric (e.g., a fingerprint) to a biometric sensor to verify the authenticity of the user. In this way, access to a service may be withheld until the user provides adequate credentials including, for example, what the user knows (e.g., a password), what the user possesses (e.g., a token) and who the user is (e.g., a physical or biometric characteristic).

The input device 716 and the access device 702 may incorporate security mechanisms to ensure that the credentials provided by a user may be secured when the credentials are maintained within and sent from these devices. For example, the input device may provide a security boundary within which any sensitive information (e.g., credentials received from the token and keys received from the access device) may be used and maintained in a secure manner. In addition, the access device may provide a security boundary to protect any sensitive information (e.g., keys and credentials)

To this end, these devices may include security modules 708 and 746 that provide cryptographic processing to, for example, sign and/or encrypt the credentials. In some embodiments information may only pass between the reader 728 and the security module 746 via a connection within a common integrated circuit. Thus, the input device may be configured so that the credentials never leave the integrated circuit in the clear.

In addition, the access device 702 may be in secure communication with the access server 704. For example, a cryptographically secured communication channel 718 may be established between the security module 708 and the access server 704. In this case, the security module 708 may process (e.g., encrypt/sign) the credentials before sending them to the access server 704. Accordingly, the security modules may provide strong authentication that the credentials are from a specific token 742 that is proximate that particular input device 716 that, in turn, is relatively proximate a specific access device 702.

After the access server 704 has received authenticated credentials from the access device 702, the access server may provide access to the requested service. As used herein the term service may include, for example, access to data and/or a data processing service. Thus, a service may enable an access device to, for example, read or write data in a data memory, access encrypted data, use cryptographic keys, gain access to cryptographic material such as security associations and keys, access a web page, access a data network or access a processing application.

As used herein the term data may include any information that may be accessed by a computing device including, for example, data files, passwords and cryptographic security associations including keys.

As used herein the term access may include, for example, acquiring, using, invoking, etc. Thus, data may be accessed by providing a copy of the data to the access device. Data also may be accessed by enabling the access device to manipulate or use the data. As an example of the latter, once a user has been authorized to access a service a trusted platform module may use keys to perform operations for the user. For a data network, access may include, for example, sending and/or receiving data over the network. For a processing application access may include, for example, invoking, interacting with or using the application or loading the application onto the access device.

An access server may comprise hardware and/or software that facilitate providing a service. For example, an access server may consist of a processing system that processes requests for service, verifies whether the requester is authorized to access the service and provides or facilitates the requested access.

In practice, an access server may be located local or remote with respect to the entity requesting service (e.g., access device 702). For example, a local trusted platform module may control access to passwords in a computing system. In addition, a remote wireless access point may control a computing system's access to a data network connected to the access point.

An access device may comprise hardware and/or software that facilitate access to a service. For example, an access device may comprise a computing system such as, without limitation, a personal computer, a server, a cellular phone, a personal data assistant ("PDA"), etc.

For convenience, FIG. 7 only depicts one token, input device, access device and access server. It should be understood, however, that a system may include any number of these components. For example, a user may use a token to access one or more services via one or more access devices. Thus, an access device may access services from multiple access servers. Also, multiple access devices may access the services provided by a given access server.

Authorization to access a service may depend on the specific token and access device being used. For example, a user may be assigned one token to access certain services through certain access devices. In addition, the user may be assigned another token to access other services through the same or other access devices. Also, multiple sets of information (e.g., credentials) may be included on a single token to enable a user to access different services or to enable multiple users to share a token.

A wireless proximity reader and token may be implemented using one or more of a wide variety of wireless proximity techniques. For example, the proximity reader and the token may support, without limitation, one or more of RFID, ISO 14443 and ISO 15693.

Tokens may be implemented in various physical forms depending upon the needs of the respective applications. For example, a token may be in a form that is easy to carry, similar to a plastic credit card, a "smart card" or a building access card. Also, a token may take the form of a tag or a label that may be attached to another article.

Examples of tokens may include, without limitation, smart cards, credit cards, dongles, badges, biometric devices such as fingerprint readers, mobile devices such as cellular telephones, PDAs, etc. In some embodiments, the token includes circuitry used in a typical smart card. For example, the token may store an encrypted password that may be sent to an authentication system.

Figure 8:
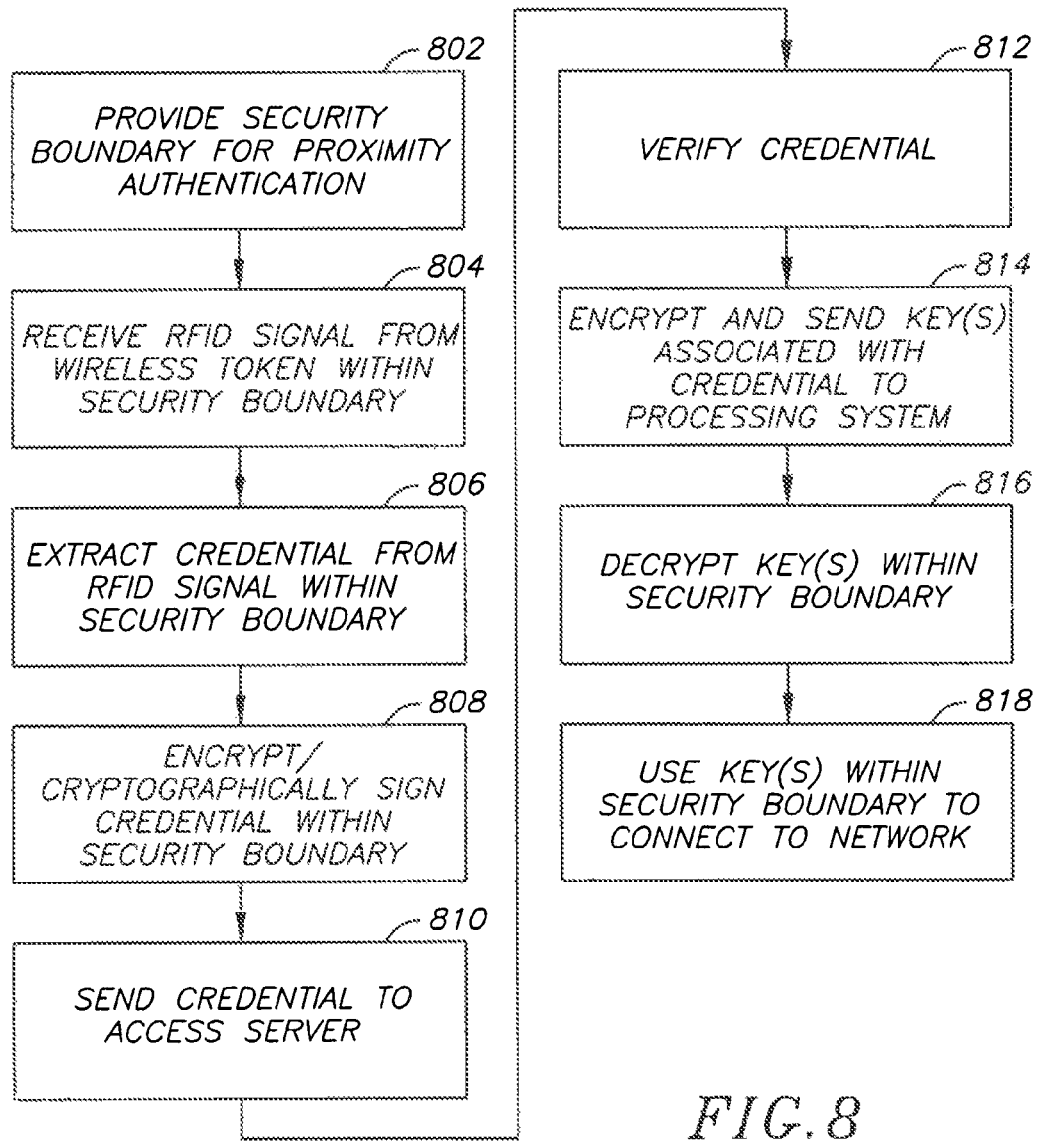
FIG. 8 is a flow chart of one embodiment of proximity-based authentication operations that may be performed in accordance with the invention.

Referring now to FIG. 8 additional details of operations and configurations in a proximity-based authentication system will be described. As represented by block 802, a security boundary is provided within the input device 716 and the access device 702 to, for example, secure the process of gaining access to a service, including securing the authentication process and information used during the authentication process. This security boundary may be established, for example, using hardware and/or cryptographic techniques.

Hardware techniques for providing a security boundary may include, for example, placing components within a single integrated circuit. As shown in FIG. 7 an RF interface 706, a security module 708 and other processing components 710 may be incorporated into a single integrated circuit 712. Thus, any processes performed or information used or stored within the integrated circuit 712 may not be compromised absent physical access to the integrated circuit 712 and the use of an invasive technique for analyzing the internal operations and data of the integrated circuit 712. For many applications, this form of hardware security boundary may provide an acceptably high level of security.

Other means may be used to provide a security boundary. For example, one or more integrated circuits (e.g., integrated circuit 712) may be protected by a physical structure using known techniques (e.g., epoxy encapsulation). Also, the access device 702 and/or its internal components may be tamper resistant and/or tamper evident.

Cryptographic techniques for providing a security boundary may include encrypting any important information that is sent to or from the integrated circuit via non-secure paths in the system. For example, security associations and keys may only appear in the clear within the integrated circuit 712. In the event keys need to be sent out of the integrated circuit 712 (e.g., to be stored in a data memory 714), the keys may first be encrypted.

Similarly, any important information that is sent between the integrated circuit 712 and the access server 704 may be encrypted. For example, information (e.g., credentials) received from the RFID token 742 may be encrypted before being sent over the link 726.

In FIG. 7 one cryptographic security boundary is represented by the dashed line 718. The line 718 represents, in part, that encrypted information may be sent between the security module 708, the processing component 710 and the data memory 714. Thus, the information may be sent securely even though the mechanism through which this information is sent (e.g., a data bus 720) may not be secure.

Encrypted information also may be sent between the integrated circuit 712 and a cryptographic processor 722 in a key manager 724 in the access server 704 via the communication link 726. In this case, the cryptographic processors may perform key exchange and encryption, decryption and/or authentication operations as necessary to send and receive the encrypted information and provide the information in the clear for internal processing.

In general, the form of protection provided within the system may depend on the requirements of a given application. For example, specifications such as FIPS-140-2 define various levels of security that may be implemented within a system The security boundary provided by the integrated circuit 712 and the cryptographic boundary 718 may be used to provide a secure mechanism for authenticating a user to access a service. For example, credentials received from the RFID token 742 may be provided directly into an integrated circuit on the input device 716 via RF signals 744.

Once the information is in the integrated circuit on the input device 716 it may be protected by the physical boundary of the integrated circuit and by a cryptographic boundary (not shown). For example, provisions may be made to ensure that the information does not appear in the clear outside of the integrated circuit. The information may then be securely sent to the access device 702 via what may otherwise be an insecure link 730.

Credentials received from the input device 716 may be provided directly into the integrated circuit 712 via RF signals 730. Once the information is in the integrated circuit it may be protected by the physical boundary of the integrated circuit and by the cryptographic boundary 718. Thus even if rogue software in the system were to gain access to the information outside of the chip 712, the software would not be able to decrypt it without appropriate key information. However, the key information also may be protected within the integrated circuit 712 and the cryptographic boundary 718. That is, the key information may not appear in the clear outside of the security boundary. As a result, the credentials may be securely routed to the access server 704.

Moreover, via this secured mechanism, the access device 702 may reliably authenticate to the access server 704 that a specific RFID token 742 is proximate the input device 716. First, as discussed above, the credentials may be received in a secure manner. Second, the effective "decision" as to whether the token 742 is adjacent may be made within a security boundary. The security module 708 may then cryptographically sign this information using a secure protocol set up between it and the cryptographic processors 722 of the key manager 724. Via this signature the access server 704 may be assured that a given message came from a specific processing system (e.g., access device 702) and that the message has not been compromised. Accordingly, proximity of the token 742 to the input device 716 may be used as a reliable method of authorizing access to a secured service provided by the service provider.

Referring again to FIG. 8, an example of operations that may be used to access a service will be described. As represented by block 804, when the RFID token 742 is within an appropriate range of the input device 716, the RFID reader 728 will receive an RFID signal 744 from the RFID token 742. As discussed above, the RFID signal 744 may be received by the input device 716 within a security boundary.

As represented by block 806, the system 700 may be configured so that any information contained within the broadcast RFID signal may be extracted only within a security boundary. For example, as shown in FIG. 7, the RFID reader 728 that extracts the credentials from the RFID signal 744 may be located within an integrated circuit that includes other functionality to protect the credentials. For example, the integrated circuit may include a security module 746 that encrypts/signs the credential (block 808) to prevent the information from being sent out of the integrated circuit in the clear. Here, the cryptographic processor in the security module 746 may use a private key to encrypt the information. A public key associated with this private key may be published with a certificate from a trusted entity. This certificate serves to verify that the public key is authentic. Cryptographic processing in the access device 702 may then use the public key to verify the signature of information received from the security module 746.

A similar secure process may then be used to send the information to the access server 704. A complementary process may be used to securely send information in the other direction across the link 726.

Accordingly, after the credential is signed by the cryptographic processor in the security module 708, the signed credential is sent to the key manager 724 via the link 726 (block 810). In this way, the information is, in effect, sent over a secured channel (as represented by the corresponding portion of the line 718) even though the actual data path may not be secure.

The key manager 724 sends the received information to the cryptographic processor 722 for decryption and/or authentication processing as necessary. The key manager 724 then verifies that the received information indicates that the user is authorized to access the network (block 812). In some embodiments the access server 704 may include a wireless proximity device (e.g., an RFID reader) and associated processing to enable the credentials to be easily and directly loaded into the access server when a user presents his or her token to the access server. In other embodiments the information may be acquired using a non-dedicated RFID reader. The acquired information may also be loaded into the access server by other means (e.g., downloaded via a communication medium).

Since the key manager 724 has received an indication via the cryptographic signature associated with the credential that the token 742 is proximate the access device 702, once the credentials are verified the key manager 724 may be assured that is safe to provide access to the requested service. As discussed above, providing access to a network may involve sending security associations or keys to the access device 702. These keys may be sent to the access device 702 via the secured channel (cryptographic boundary 718). Accordingly, the cryptographic processor 722 may encrypt the keys before sending them over the link 726 (block 814).

The access device 702 may be configured so that these keys, etc., are decrypted and maintained within the security boundary of the access device 702 (block 816). For example, the keys may be stored within the integrated circuit 712 (e.g., keys 740). Alternatively, a cryptographic processor in the security module may use a key (e.g., keys 740) to encrypt the received keys before storing them in the data memory 714.

As represented by block 818, the access device may then use the received keys to gain access to the network as discussed herein. Again, in some embodiments these keys may only be used in the clear within the security boundary of the access device 702.

Additional details of a proximity authentication device are disclosed, for example in commonly-owned U.S. patent application Ser. No. 10/955,806, filed Sep. 30, 2004, the disclosure of which is hereby incorporated by reference herein.

Figure 9:
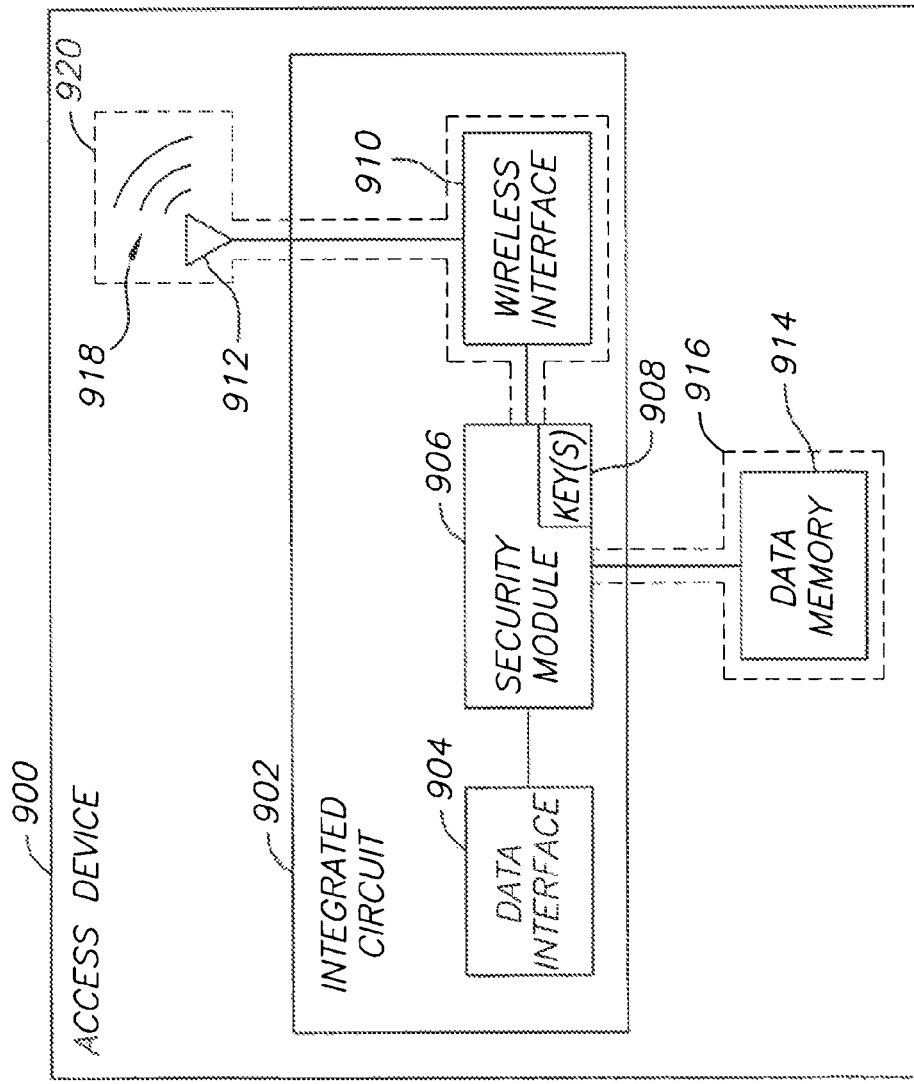
FIG. 9 is a simplified block diagram of one embodiment of an access device constructed in accordance with the invention.

FIG. 9 illustrates another embodiment of an access device that provides a secure mechanism for entering credentials. An access device 900 includes a data interface 904 that is located within a security boundary of the access device 900. For example, the data interface 904 may be located on the same integrated circuit 902 as a security module 906. As a result, credentials may be directly entered into the security boundary.

In addition, the security module 906 may use one or more keys (e.g., keys 908) to encrypt credentials within the security boundary so that the credentials are not provided in the clear outside of the security boundary. Thus, the security module effectively extends the security boundary using cryptographic techniques. For example, the security boundary may be effectively extend (as represented by dashed lines 916) to an external data memory 914 by encrypting data before it is stored. In addition, the security boundary may effectively extend (as represented by dashed lines 920) through a communication medium to another cryptographic processing system (not shown).

In the embodiment of FIG. 9, the access device incorporates a wireless interface 910 and an antenna 912 (or another form of a wireless transceiver) to communicate with other wireless devices (e.g., a wireless access point and access server, not shown) via wireless signals 918. In some embodiments the data communication interface 910 for the access device may advantageously be located on the same integrated circuit as, for example, the security module 906. The wireless interface may support, for example, 802.11, Bluetooth and/or other wireless communication standards.

In some embodiments the access device may forward the input information to, for example, an access server to gain access to a service. The information also may be enrolled with a key manager. Thus, as described above, the key manager may compare information received from an access device with the key manager's database of authorized credentials (e.g., fingerprint data). When a match is received, the key manager may provide the associated key(s) to the requesting access device.

In some embodiments the access server may include an input device and associated processing to enable the information to be easily and directly loaded into the access server. In other embodiments the information may be acquired using a non-dedicated input device (e.g., a sensor). The acquired information may then be loaded into the access server by other means (e.g., downloaded via a communication medium).

Figure 10:
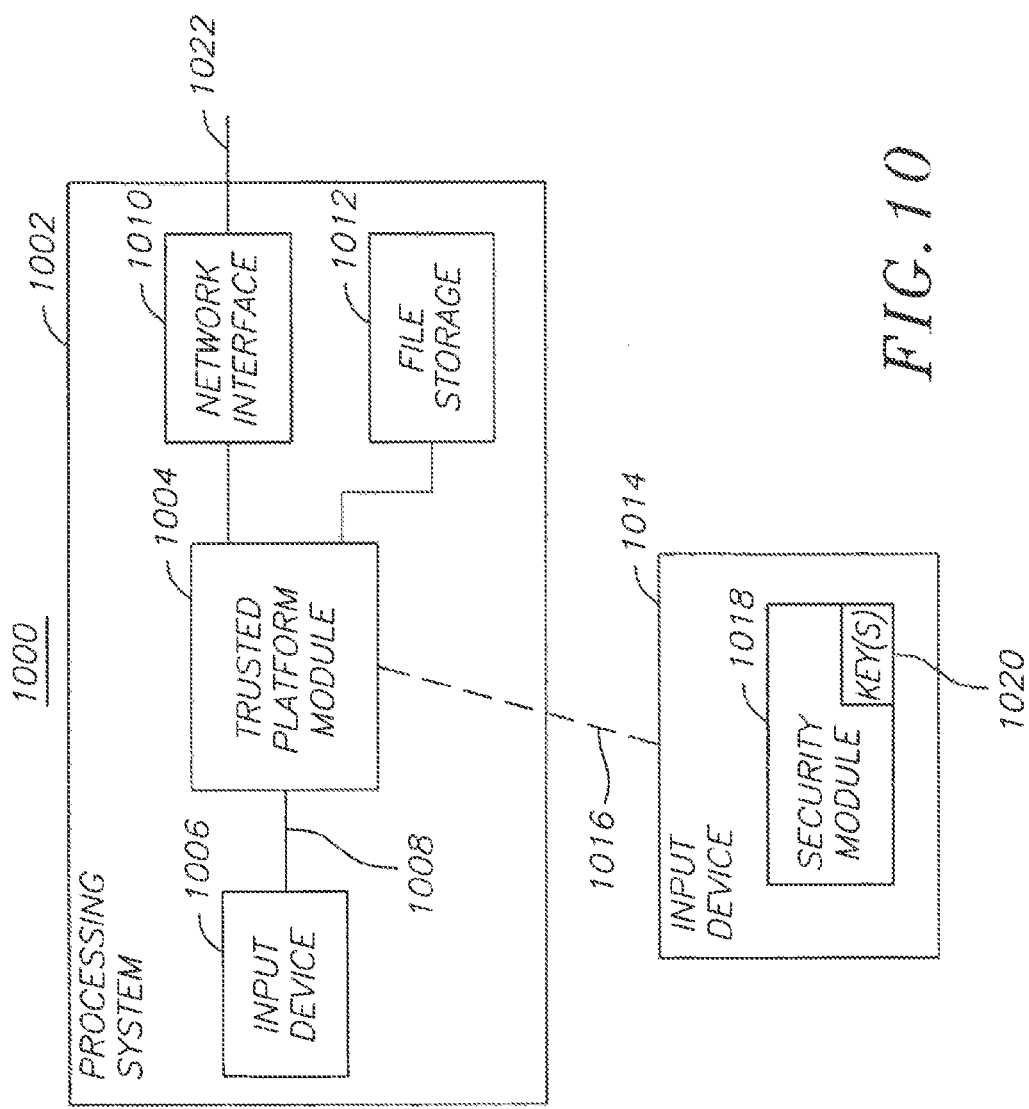
FIG. 10 is a simplified block diagram of one embodiment of a processing system constructed in accordance with the invention.

FIG. 10 illustrates one embodiment of a system 1000 that provides a secure mechanism for a user to enter credentials. A processing system 1002 includes a secure processing system such as a trusted platform module ("TPM") 1004.

Typically, the trusted platform module may generate and maintain keys for the processing system. For example, a TPM may provide a set of cryptographic capabilities that enable certain computer functions to be securely executed within the TPM environment (e.g., hardware). To this end the TPM may include one or more cryptographic processors that perform cryptographic operations including, for example, encryption, decryption, authentication and key management. Specifications for a TPM are defined by the Trusted Computing Group organization.

Typically, to enable access to services managed by the TPM, a user must first enroll his or her credentials with the TPM. This may involve, for example, providing a password to the TPM. To this end, the TPM may include an input device (not shown) that incorporates some of the secure input mechanisms and techniques disclosed in the previous discussions and the discussions that follow (e.g., direct connection, RFID, biometric sensor, keyboard, etc.).

Then, when a user wishes to access the services managed by the TPM, the user must authenticate himself or herself to the TPM. This may involve, for example, providing the original password to the TPM. To this end, the processing system 1002 may include an input device 1006 that is connected to the TPM via a link 1008.

In some embodiments, the link may be routed directly from the input device to the TPM to ensure that data may be securely sent over the link. For example, data from this link may not routed using software routines such as operating system calls. In addition, data from the link may not be stored in data memory that is accessible by other components in the system. For example, the data may not be sent through a software stack and may not be stored in a data memory that is accessed via an internal bus such as a PCI bus. Consequently, input information may be passed to the TPM without being compromised by viruses, hackers, etc., that may have compromised the system. In some embodiments an additional degree of protection may be provided by physically embedding or attaching the input device 1006 within/to the processing system.

Through the use of physical and cryptographic techniques the TPM securely uses and maintains sensitive information such as these credentials within its security boundary. After verifying the credentials (e.g., comparing the received credentials with previously enrolled credentials) within the security boundary, the TPM 1004 may provide the requested access or may facilitate acquiring access to a service from another processing entity.

In some embodiments a user may authenticate himself or herself to the TMP to use keys stored within the security boundary of the TPM. For example, the system of FIG. 10 may be used to access encrypted data (e.g., an encrypted password) stored in a local data memory (e.g., file storage 1012). In this case, the TPM 1004 may store cryptographic information (e.g., keys, security associations, etc.) that enables the TPM to decrypt encrypted data. In a typical case, once the user is authenticated, the TPM will use the key within its security boundary, then provide the results to the user. For example, the TPM may return decrypted data (e.g., media content) or signed data to the user. In this way, the keys may be used without exposing the keys in the clear outside the security boundary of the TPM.

In the event there is insufficient storage for the keys in the TPM, the TPM may encrypt the keys and send them to an external data storage component (e.g., file storage 1012). Thus, even if the encrypted data files in the file storage 1012 may be accessed by other components in the system the security of the encrypted data may be maintained because the keys are encrypted. In other words, sensitive information is only used in the clear within the security boundary of the TPM.

In some embodiments the TPM 1004 may control access to one or more data networks 1022 that are accessed via a network interface 1010. Here, the TPM 1002 may provide network authentication credentials (e.g., a certificate) to a service provider (e.g., an access point, not shown) connected to a network to authenticate it to the service provider. These network authentication credentials may be securely stored in a data memory (not shown) in the TPM 1004 or stored in encrypted form in the file storage 1012.

The network interface 1010 may be used to connect to wired and/or wireless network(s). As discussed herein, cryptographic techniques may be used to ensure the security of data transferred between the TPM 1004 and other devices connected to the network. Accordingly, a network connection may be used, for example, to communicate with a key manager to obtain key information (e.g., security associations) and authorization for key usage.

Input device 1014 depicts another embodiment of an input device that may be used to securely provide information (e.g., credentials) to the processing system. The input device 1014 includes a security module 1018 and keys 1020 implemented within a security boundary to provide cryptographic functionality. For example, the security module may be used to encrypt/sign information (e.g., credentials) entered into the input device. In this way, this information may be securely sent (as represented by dashed line 1016) to the TPM 1004.

The security module 1018 and the trusted platform module 1004 may include components and perform operations as discussed herein to provide strong authentication and establish a secure channel. For example, a public key and associated certificate may be published for the security module 1018 to enable the TPM to verify the authenticity and the security of the input device using techniques as discussed herein. As a result, a secure channel 1016 may be established between these components such that the security boundary of the TPM may, in effect, be extended to include the input device 1014 and the secure channel.

Since information sent between the components may be secured in this manner, the input device 1014 does not need to be securely connected to the processing system. Thus, the input device 1014 may be advantageously used in applications where the input device is remote from the processing system 1002 and connected to the processing via, for example, a wired or wireless interface such as a network. In addition, the input device may be advantageously used in applications where the input device may be connected to the TPM via an insecure link (e.g., a USB link in a computer).

In some embodiments, the input mechanism (e.g., a key pad, a sensor, etc.) on the input device 1014 may be connected in a secure manner to the security module 1018. For example, the input mechanism may be located on the same integrated circuit as the security module. In addition, these components may be implemented within a physically protected enclosure. Accordingly, the security boundary of the input device 1014 may include the input mechanism, the security module 1018 and external memory (not shown) that the security module uses to store encrypted information. As a result, the input device 1014 may provide a highly secure mechanism for a user to provide credentials to the TPM 1004

Referring now to FIGS. 11-14 selected components and operations of several embodiments of security modules will be discussed in more detail. In some embodiments a security module may provide key protection and management (e.g., enforcing proper usage of keys) required for multiple levels of key material.

In addition, a security module may provide cryptographic processing such as encryption, decryption, authentication, verification and signing for a device that uses cryptographic services (e.g., an access device) in which the security module is installed. For example, a security module may be implemented in end-user client devices such as cell phones, laptops, etc., that need some form of data security, authentication, etc. In some embodiments the security module may be integrated into previously existing chips (e.g., a main processor) within these devices.

The security module may be configured as part of and to enforce a security boundary. For example, the security module may be configured to never allow clear text keys to exit, for example, the security module or the chip within which the security module is implemented. As a result, the security module may be safely integrated into other devices or systems regardless of whether the system outside of the security boundary is secure.

In this way, the security module may provide highly secure and cost effective remote key management for a client device. The security module may provide and/or support any required cryptographic processing. A security boundary is established within the device to securely maintain and use keys and key material. Yet the system may be securely managed by a remote key management system (e.g., a hardware security module, a TPM, etc.) via the security module. Accordingly, a high level of security functionality may be provided for the end-user device using a relatively small security module that has minimal impact on the rest of the device.

Figure 11:
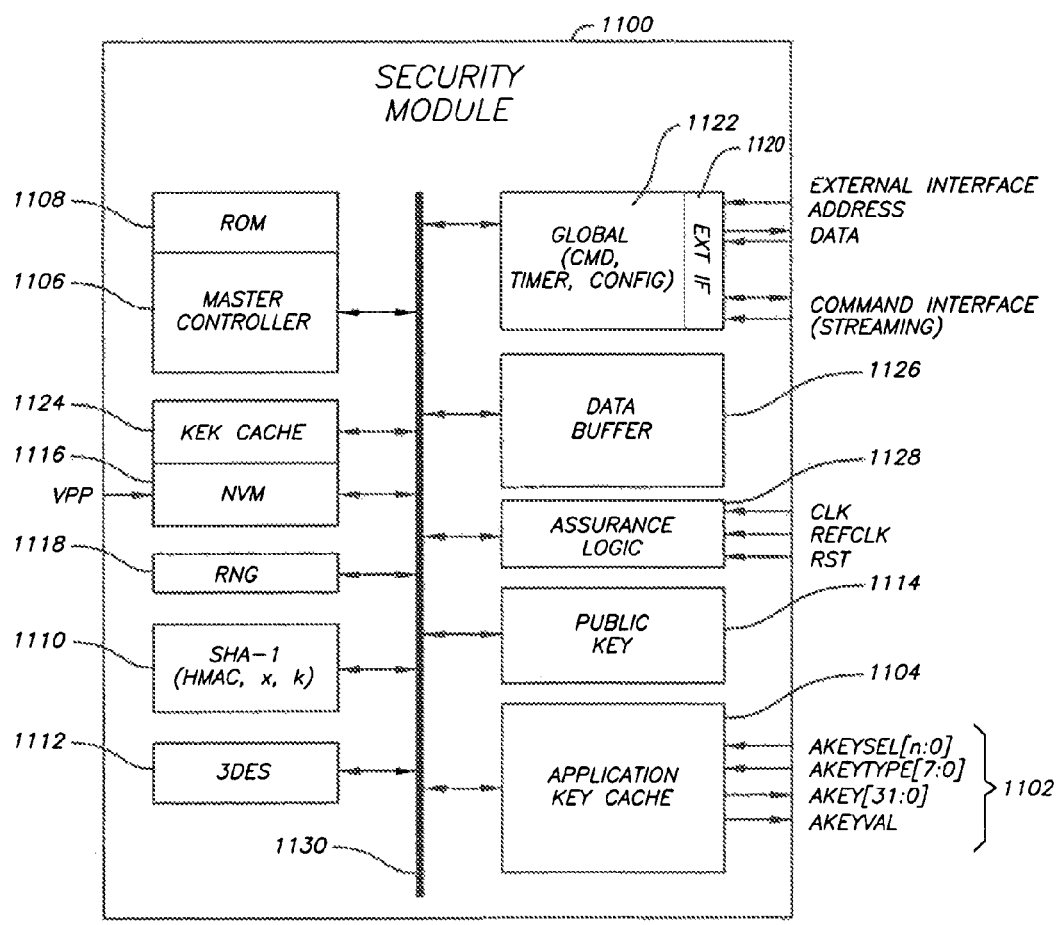
FIG. 11 is a simplified block diagram of one embodiment of a security module constructed in accordance with the invention.

To support this key usage and management scheme, a security module provides mechanisms for securely loading one or more keys into the module, securely storing the keys and securely using the keys. One embodiment of a stateless hardware security module 1100 that provides such mechanisms is depicted in FIG. 11.

The stateless module 1100 includes a master controller 1106 for controlling the overall operation of the module. For example, the controller may control boot operations, key management operations (if applicable) and data and key traffic flow into and out of the module. The controller may comprise, for example, a processor and associated code (e.g., ROM 1108) and/or a state machine or other hardware. The controller and/or any other component in the stateless module may communicate with other components in the stateless module via an internal bus 1130.

In some embodiments the master controller 1106 comprises a RISC processor with ROM code to execute the various commands necessary for the operation of the stateless module. The master controller block also may include the address decoder for each of the slave blocks on the internal bus 1130. The RISC engine may use a protected portion of a data buffer 1126 for temporary stack and scratch data space.

A bi-directional external interface 1120 provides a mechanism to send keys and/or data to or receive keys and/or data from the module. For example, the external interface may include registers that may be written to or read by the controller and external devices (e.g., a host) that are connected to the stateless module. In this case, the controller may be configured so that it never writes certain data (e.g., unencrypted keys) to the registers.

The external data interface 1120 may be used by a local host to read global registers, issue commands and place data into the data buffer 1126 for processing by the stateless module. The external interface may be controlled through a global register block 1122 by the master controller. These global registers may include, for example, command ("CMD"), timer and configuration ("CONFIG.") resisters. The master controller transfers the data between the global registers block and a data buffer memory 1126.

The command interface provides a streaming data interface directly into the data input and data output registers. It allows an external FIFO to be used for data input and data output (separate FIFOs). This interface allows the stateless module to be easily embedded into a packet based system.

In some embodiments, data (e.g., data to be processed or key material) to be encrypted or decrypted may be sent to or sent from the stateless module 1100 via one or more data interfaces. For example a data interface 1102 may be used to send encrypted data or keys (e.g., that were decrypted by the module) to a cryptographic accelerator and vice versa. In addition, a data interface may be connected to an input device (e.g., a sensor) that generates data that needs to be encrypted by the stateless module. This encrypted data may then be sent to an external processing component via the external interface 1120.

One or more cryptographic processing blocks perform any cryptographic processing that needs to be done to acquire or use keys or to cryptographically process data flowing though the module. For example, separate processing blocks may be used to perform asymmetric key algorithms such as DSA, RSA Diffie-Hellman (block 1114), key exchange protocols or symmetric key algorithms such as 3DES, AES (block 1112) or authentication algorithms such as HMAC-SHA1 (block 1110). The cryptographic processing block may be implemented, for example, in hardware and/or using a processor that executes code stored in a data memory (e.g., ROM).

Typically this embodiment includes processing to generate asymmetric keys that are used to establish a secure channel with a remote device and to authenticate information sent from the module to the remote device and vice versa. Here, the private portion of the asymmetric key may be maintained within the security boundary of the chip. In addition, the stateless module also will include a mechanism for exporting the public version of the asymmetric key. For example, the public value may be loaded into the external interface register discussed above so that it may then be read by an external device. The public key value may be read from the stateless module by issuing a public key read command to the stateless module. In response to this command the module returns the public key value and any non-secure configuration information for the device (authorization data, product configuration data, etc.).

In some embodiments a root, identity key serves as the basis for the asymmetric key. For example, the root key for the module may comprise an asymmetric key pair (secret or private, public) that is used to uniquely identify the stateless module. In some embodiments this key is only used for digital signatures to securely identify the stateless module.

In some embodiments, one or more keys (e.g., the root, identity key for the module) may be injected into the stateless module. This may be performed, for example, when the chip is manufactured, when the chip is tested, during manufacture at an OEM (e.g., circuit board manufacturer), during OEM testing or during installation for the end user. This technique may be used to inject symmetric and/or asymmetric keys.

In some embodiments, the stateless module may generate one or more keys (e.g., the root, identity key) internally. For example, the stateless module may include a random number generator ("RNG") 1118 and other circuitry necessary to generate a key. This embodiment may provide added security in that the generated key may never leave the security boundary of the chip.

In some embodiments the device identity key comprises a collection of random bits that are used to generate the key material for the long term fixed keys in the stateless module. For example, the RNG 1118 may generate a random number using the internal random number value as a secret initialization seed. The number of bits in the initialization seed may be determined by the amount of key entropy required for the system.

In some embodiments the value from the random number generator 1118 may not be used directly. For example, it may be post processed using the SHA-1 block 1110 by the master controller before internal usage and before exposing the number external to the stateless module as a random value. The master controller may maintain a cache of post processed random bits (for key generation and for signing) in the data buffer 1126.

The random number generator 1118 may be a "true" random source. For example, it may utilize free running oscillators to capture thermal noise as the source of randomness.

The stateless module also may include a privacy (or confidentiality) asymmetric key pair that may be used for transferring secure content to the stateless module device via an intermediate insecure third party such that the third party does not have access to the key material. In some embodiments the confidentiality key is only used to decrypt key material within the stateless module.

The above keys (e.g., the root, identity key, etc.) may be stored in a nonvolatile data memory ("NVM") 1116. The NVM may comprise, for example, a one-time programmable ("OTP") memory or battery backed memory (BBMEM) that is located on-chip or off-chip.

In some embodiments an on-chip OTP memory (as shown in FIG. 11) may provide certain advantages. For example, in this case the keys may be physically protected within the device so that they cannot be easily altered or observed. In addition, since the use of the keys may be confined within the chip, the keys may not appear in the clear outside of the chip.

Moreover, this OTP and stateless module combination may then be implemented using a standard CMOS process. As a result, the stateless module may be readily integrated into a variety of conventional chips that are used in end-user and other devices. Such a combination may provide a very cost effective security solution.

Examples of architectures and implementations of OTP memory that may be advantageously implemented in CMOS are described in, for example, U.S. Pat. Nos. 6,525,955, 6,693,819, 6,700,176 and 6,704,236 and U.S. patent application Ser. No. 09/739,952, filed Dec. 20, 2000, the disclosure of each of which is hereby incorporated by reference herein.

The OTP may be programmed by the master controller 1106 via a programming interface in conjunction with an external programming signal VPP. The master controller may ensure (via local hardware enforcement) that the device keys, authorization and configuration data can be programmed once and only once.

The key-encryption-key ("KEK") cache 1124 is a separate memory block sized based on the required number of KEKs in the system. Typically, it is large enough to hold the session private key and a single asymmetric group key.

The KEK Cache 1124 may be protected in hardware during the execution of any command that does not require a KEK key. For example, a signal from the global registers may be provided to the KEK cache to indicate that the command register is locked, active and contains a command that requires a KEK. Some KEK cache locations are contained in the NVM block that is used to implement the long term keys for the stateless module.

The application key cache 1104 may be used by the master controller to provide encryption and decryption storage for the internal acceleration cores (such as the public key core 1114 or the 3DES core 1112). The application key cache may enforce key lifetime expiration when the keys are used by either the stateless module commands or the application key cache interface.

In general, the performance, size and function of the blocks discussed above may be scaled to meet the demands of the system. For example, the basic cryptographic functions that implement the secure channel back to the key manager to transfer and process key material (and/or policy) may be provided at minimal processing performance levels.

The cryptographic accelerators contained within the stateless module can be used for application data processing when they are not being used for key management functions. For example, a stateless module for an e-commerce application may be used to protect RSA private keys. Here, the public key acceleration required for the secure channel is typically minimal (less than 10 operations/sec). Consequently, any spare processing capacity (e.g., idle cycles of a processor) may be used for other operations.

In contrast, public key acceleration required for a typical e-commerce accelerator is relatively high (greater than 500 operations/sec). Applications such as this may require the use of cryptographic accelerators that are specially designed to perform cryptographic operations at a high rate of speed.

One or more cryptographic accelerators may be attached directly to the stateless module via the application key cache interface 1102. Typically, the application key cache interface for the add-on cryptographic acceleration processing is maintained within the security boundary. For example, the stateless module and the cryptographic accelerators may be implemented on the same chip. In this manner, the cleartext keys are not allowed to leave the security boundary which also includes the public key accelerator. However, the external application may use the public key accelerator as it normally would by simply referencing the appropriate RSA private key stored in the stateless module.

The application key cache 1104 also may store key material that may be used by external cryptographic acceleration processors. For example, the cache 1104 may store decrypted application keys (e.g., the RSA private key for an application executing on the device that contains the stateless module).

The stateless module enforces key policy for keys used within the remote client. The key policy may be set by the key manager for all keys that are delivered to the stateless module. The key policy indicates how the key can be used by the stateless module. In addition to usage policy, the stateless module can enforce a lifetime for keys. Typically, a key lifetime is a relative time from the time at which the key is loaded into the stateless module. The key manager can use the multiple levels of key hierarchy and the lifetime policy enforcement to ensure that keys are used properly and are revocable at the stateless module.

A security assurance logic block 1128 protects the stateless module from system security attacks. To this end, several system monitors may be coupled with the other components in the stateless module and/or the chip (and/or the system) within which the stateless module resides.

In some embodiments, the protection circuits trigger a reset of the stateless module when an attack is detected. This reset may wipe out all transient information in the stateless module. For example, all key cache locations may be cleared. An interrupt may be provided to the local host with information on which protection mechanism triggered the reset.

A low frequency protection circuit ensures that the operating frequency of the stateless module does not fall below given threshold. This ensures that the time tick register value can not be compromised within the limit of a reference frequency. In addition to protecting the time tick value, the low frequency protection circuit makes it more difficult to implement successful dynamic attacks that attempt to read values within the stateless module while it is operating. In this case, the higher the threshold value, the better protection that is provided.

An operating point protection circuit may be provided to ensure that all logic within the stateless module operates as designed for all process, voltage and temperature conditions (or across all operating points). The protection circuit helps ensure that an attacker cannot change the operating point such that a timing path is violated in the stateless module.

A watchdog timer block may be used during processing to ensure that command execution completes within an expected period of time. The timer is set by the master controller whenever a command (or sub-command such as a public key operation) is started. The set time is based on the expected maximum command length. If the watchdog timer reaches zero a reset is issued to the stateless module. The watchdog timer cannot be turned off and must be written periodically by the master controller to avoid clearing the stateless module. The watchdog timer may be frozen when the stateless module is taking command input from the host.

A reset monitor provides protection against multiple reset attacks. The reset monitor uses a timer based on the time tick register increment that requires at least one tick before allowing more than, for example, sixteen resets to occur. If more than sixteen resets occur within the time tick, the stateless module will require at least two time ticks before releasing the sixteenth reset. The reset protection is disabled until the NVM has been properly programmed. For example, it may be disabled during manufacturing tests.

A hardware protection mechanism may be provided for entering and exiting a secure state while the stateless module transitions between enabling/disabling the external interface. The stateless module boots to a secure state with the external interface disabled. That is, the interface is locked out by hardware. Once reset processing and self-tests have completed, the master controller sequences through a series of commands to exit the secure state and enter a USER state. In some embodiments these commands require execution of a predefined set of sequential instructions be written to non-sequential addresses.

The hardware tracks the number of clocks it takes to execute each step of the sequence and ensures that these commands occur in the required order to the required address at exactly the right clock cycle. After the exit logic has completed, the mode is set via hardware to USER mode. In USER mode, the hardware locks out master controller access to all of the internal blocks except the data buffer and the data input/output registers (only blocks that are required to move data into the device).

Once the command has been moved into the data buffer, the master controller sequences a series of commands to return to the secure state. This sequence is again tracked and enforced via the hardware block to enter into secure mode. It also ensures via hardware that the master controller enters the secure mode with the proper entry address.

The master controller ROM 1108 may be programmed using an extra bit to indicate which instructions are valid code entry and code exit points. The instruction code entry/exit points are enforced in hardware whenever the master controller takes a non-sequential code fetch. This mechanism helps to ensure that it will be difficult for an attacker to get the master controller to bypass certain portions of code. As a result, it may be virtually impossible to successfully attack the module by causing random jumps in the program execution.

To reduce cost and die space, the stateless module may not handle processing related to communication protocols. Instead, the requirements of communication protocols may be handled by an associated device driver (or integrated processor).

In an alternative embodiment, the stateless module may be assigned long-term keys. In this case, the stateless module may not need to interface with a head-end server (e.g., key manager).

Figure 12:
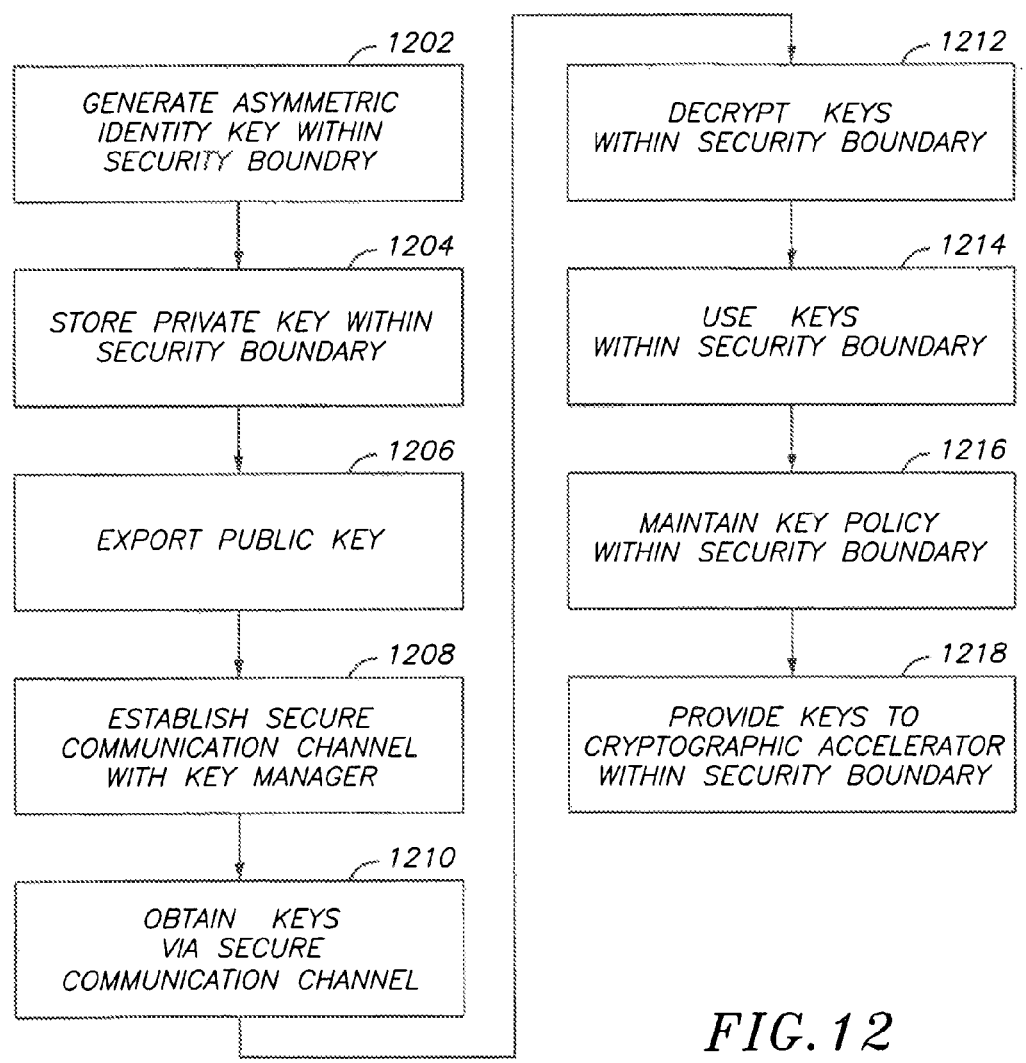
FIG. 12 is a flow chart of one embodiment of operations that may be performed in accordance with the invention.

Referring now to FIG. 12, an example of operations that may be performed by one embodiment of a stateless module will be discussed. As represented by block 1202, when the stateless module is initialized for the first time after manufacture (e.g., during final test of the chip), the master controller may cause the random number generator 1118 to generate a random number that is provided as a seed to a cryptographic processor that generates a public-private key pair.

The master controller stores the private (identity) key in the nonvolatile memory 1116 and never exports this key outside of the security boundary of the module (block 1204). For example, in some embodiments the key never leaves the chip within which the stateless module resides. In some embodiments this key is encrypted before being stored in off-chip non-volatile memory.

The stateless module also stores the corresponding public key and, upon request, exports the public key (block 1206) so that the device manufacturer (or some other trusted entity) may publish the public key along with a certificate to a public server.

The stateless module may then be deployed in a computing device that can connect to another device (e.g., a key manager) via a network or some other link. As represented by block 1208, the stateless module may use its private key to establish a secure communication channel with, for example, a security module (e.g., a key manager) that has access to the stateless module's public key.

As represented by block 1210 the key manager may send keys to the stateless module via the secure communication channel. For example, the key manager and stateless module may negotiate to obtain additional keys that may be used to provide secure communications between the two components. In addition, the key manager may send keys to a remote client via the stateless module. For example, the key manager may generate a private session key (Ka-priv) for a client that incorporates the stateless module. As discussed above, the key manager may encrypt this key using the stateless module's public key (Kdc-pub) or some negotiated key before sending it to the client.

As represented by block 1212, the keys are decrypted within the security boundary associated with the stateless module. For example, cryptographic processors in the stateless module may decrypt these keys. Alternatively, another cryptographic processor located on the same chip as the stateless module may decrypt the keys.

As represented by block 1214, the stateless module may then use the keys within the security boundary. For example, cryptographic processors in the stateless module may use these keys to decrypt other keys (e.g., session keys). In addition, the stateless module may enforce key policy within the security boundary (block 1216).

In some embodiments, as represented by block 1218, the stateless module may provide keys to one or more cryptographic accelerators within the security boundary. For example, the cryptographic accelerators may be located on the same chip as the stateless module.

Figure 13:
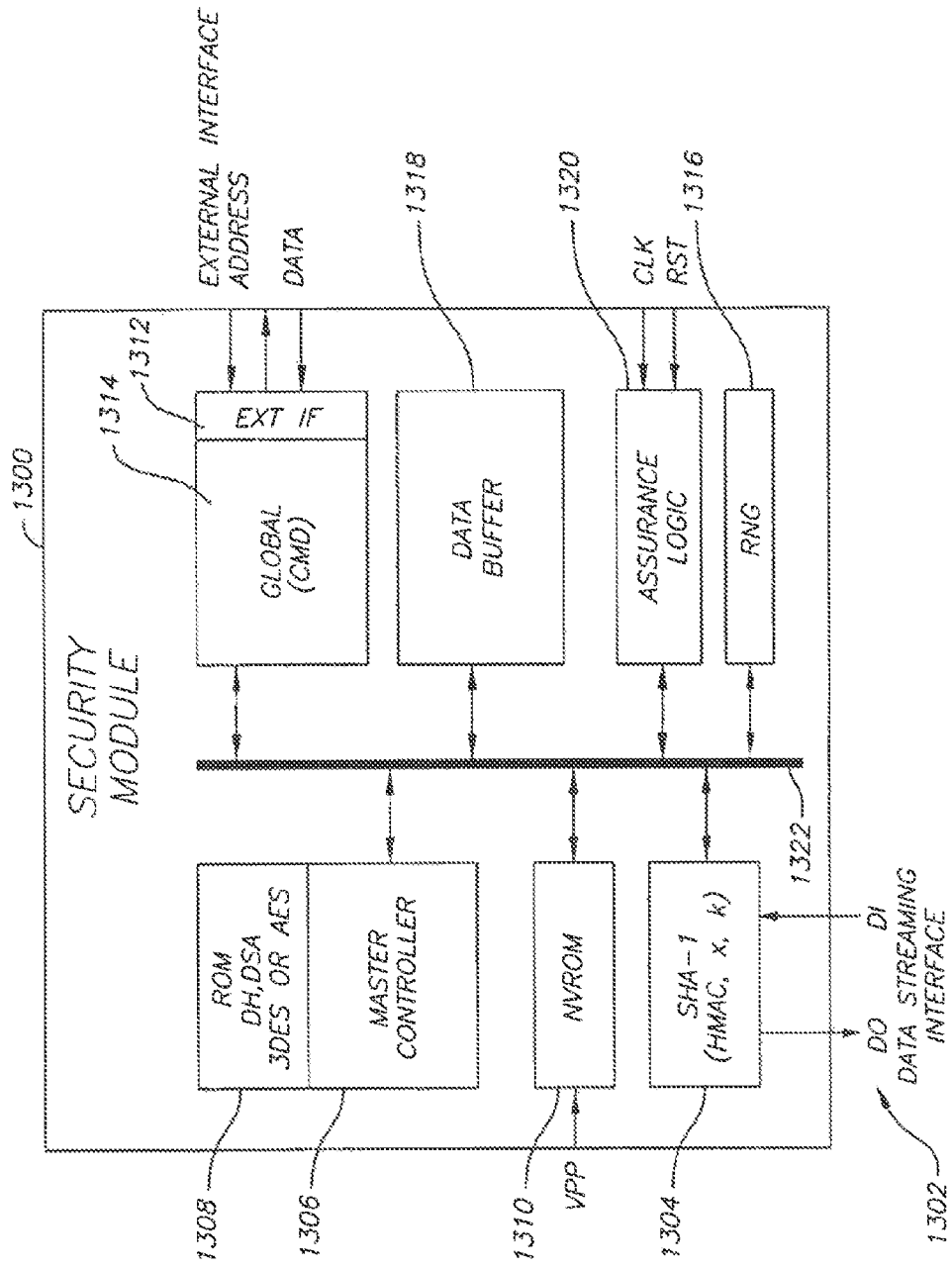
FIG. 13 is a simplified block diagram of one embodiment of a security module constructed in accordance with the invention.

Referring now to FIG. 13, one embodiment of a stateless secure link module 1300 will be discussed in detail. This embodiment includes, in general, a subset of the functionality of the embodiment of FIG. 11. In particular, this embodiment only provides data encryption, decryption, etc. using a symmetric key. One advantage of this configuration is that it may be implemented in other devices with even less impact on the cost and the size of the devices.

In a typical application the embodiment of FIG. 13 is used to take data that originates from an input device and securely provide that data to a recipient device that uses the data (e.g., an access device or an access server). This process may involve encrypting the data so it does not appear in clear text and/or signing the data to certify to the recipient device that the data originated from a specific input device.

For example, the stateless module may be integrated into a chip for a sensor (e.g., a biometric sensor such as a fingerprint reader). Here, the stateless module may be used to sign and/or encrypt the information generated by the sensor. The stateless module may then securely send the information to a recipient device that uses the information. In this case, the recipient device may use a fingerprint comparison as a means to control access to data or a service.

In some embodiments the sensor data is always maintained within a security boundary. First, by incorporating the stateless module into the sensor chip, the information may be encrypted before it leaves the hardware boundary of the chip. Second, the stateless module may establish a secure channel with the recipient device through a symmetric key exchange. In this way, the information may be securely sent to the recipient device. Third, the recipient device may be secured in a conventional manner or using techniques as described herein.

As an example of the latter scenario, the recipient device may include a stateless module as described above in conjunction with FIG. 11. In this case, the recipient device may use other keys to, for example, securely send the information to a remote system. One example of such a remote system is a network access device that enables access to a network based on the user's credentials such as the user's fingerprint.

In other embodiments, it may only be necessary to establish that the data originated from a specific input device. For example, the system may make other provisions to ensure that a copied fingerprint data stream is not being replayed at a later time. In this case, it may be unnecessary to encrypt the information. All that may be needed here is an assurance that the information is being sent by a specific sensor. In this case, adequate security may be provided by simply signing the data.

To provide a solution that is cost effective for a variety of input devices, the stateless module of FIG. 13 has a reduced set of functionality as compared to, for example, the embodiment of FIG. 11. The stateless module includes a master controller 1306 and an external interface 1312 to enable the asymmetric key operations that are performed when the secure link is initially established with, for example, a key manager. Thus, the controller 1306 includes circuitry to generate and verify the validity of its keys. In addition, the module may include assurance logic 1320 similar to that discussed above.

However, because the module only uses a single symmetric key, much of the functionality depicted in FIG. 11 is not provided in the embodiment of FIG. 13. For example, the module does not need to provide management capabilities (e.g., enforcement of key policy) and data storage (e.g., application key cache) for extra keys. Also, the non-volatile ROM ("NVROM") 1310 may be smaller since it may only store, for example, an identity key and a symmetric key.

Moreover, as this module only performs symmetric cryptographic processing on data from a data streaming interface, some or all of the dedicated cryptographic processors shown in FIG. 11 (e.g., the public key processing and 3DES) may not be needed. For example, the module only performs the asymmetric key operations once after it boots up. In addition, the stateless module does not need to verify the authenticity of the recipient of the data. Accordingly, the remaining cryptographic processing operations may be performed by the master controller 1306. In this case, the application code for cryptographic algorithms (e.g., DH, DSA, 3DES, AES) may be stored in a ROM 1308.

The embodiment shown in FIG. 13 may secure an incoming data stream (DI) by signing it using the SHA-1 algorithm. Accordingly, a separate processing block 1304 may be provided for this operation. The signed output of this processing block provides a data stream (DO) that is sent to the recipient device via a data interface 1302. In an embodiment that also encrypts the data stream, a dedicated processing block (not shown) may be provided to implement, for example, a symmetric encryption algorithm.

Figure 14:
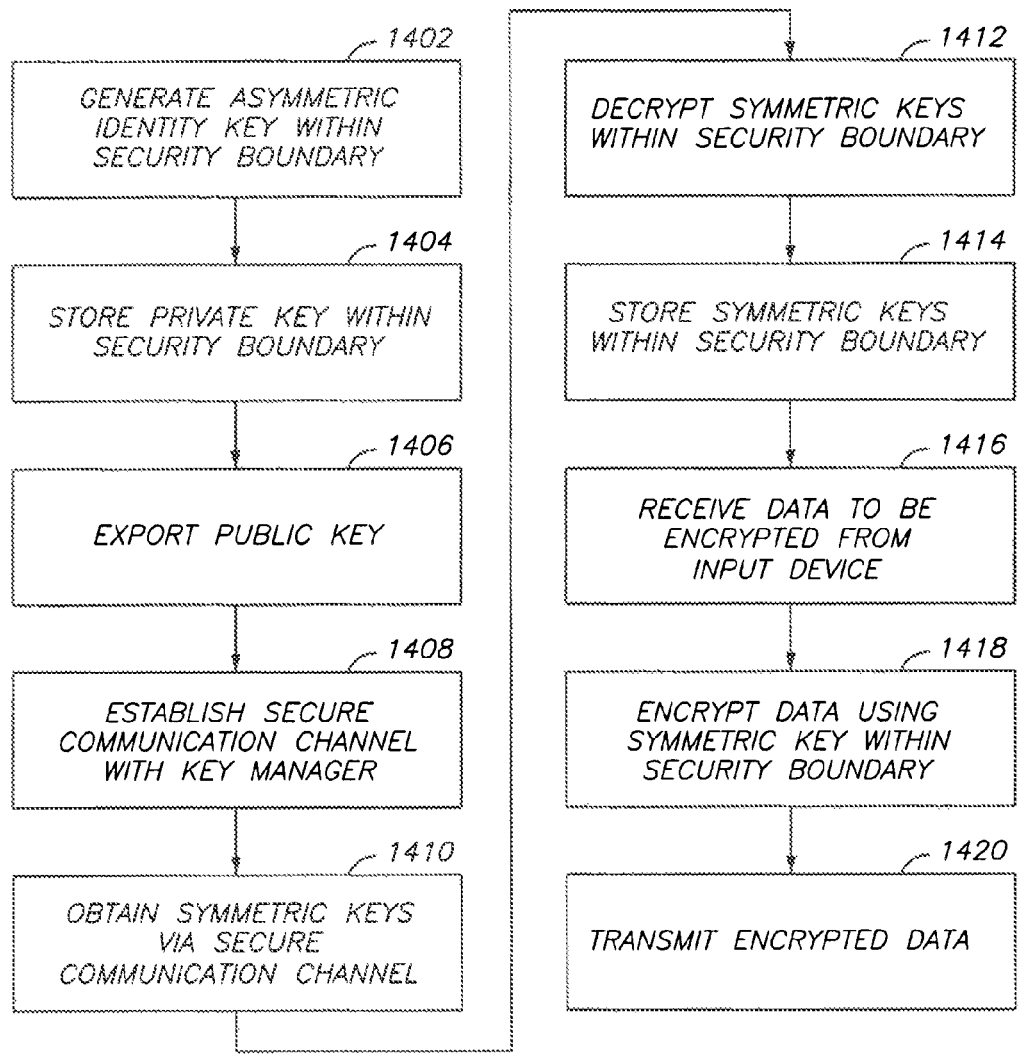
FIG. 14 is a flow chart of one embodiment of operations that may be performed in accordance with the invention.

Referring now to FIG. 14, an example of operations that may be performed by one embodiment of a stateless secure link module will be discussed. As represented by blocks 1402-1408, a stateless secure link module generates a public-private key pair, stores the private (e.g., identity) key in nonvolatile memory within the security boundary, exports the public key and establishes a secure communication channel with, for example, a key manager.

As represented by block 1410 the key manager may send symmetric keys to the stateless secure link module via the secure communication channel. For example, the key manager may send symmetric keys that are used to encrypt and/or sign data that the stateless secure link module receives from an input device. The cryptographic processors may then decrypt these keys (block 1412) and store the decrypted keys (block 1414) within the security boundary associated with the stateless secure link module.

As represented by block 1416, the stateless module may receive data to be encrypted from an input component. As discussed above the input component may be, for example, a biometric sensor, a sensor for a camera, etc., or any other device that needs data to be authenticated or securely transmitted to another (e.g., remote) device (e.g., the recipient device).

As represented by blocks 1418, the stateless module uses the symmetric keys within the security boundary to encrypt the data. Then, as represented by block 1420, the stateless module sends the encrypted data to the remote device.

In some embodiments the symmetric key may be injected into the stateless module during manufacture (e.g., during chip test). In this case, all or a portion of the external interface 1312, the RNG 1316 and the asymmetric key processing circuitry may not be needed. Accordingly, in some embodiments a stateless module may simply include a relatively small master controller for injecting the symmetric key and perform other basic operations, a nonvolatile memory, a data buffer memory, a cryptographic processor for the symmetric key operations and optionally, assurance logic.

Additional details of security modules are disclosed, for example, in commonly-owned U.S. patent application Ser. No. 11/159,640, filed Jun. 21, 2005, entitled STATELESS HARDWARE SECURITY MODULE, the disclosure of which is hereby incorporated by reference herein.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire, light pulses transmitted through air or over an optical fiber or electromagnetic (e.g., RF or infrared) radiation transmitter transmitted through the air.

A signal may comprise more than one signal. For example, a signal may consist of a series of signals. Also, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

A wide variety of devices may be used to implement the data memories discussed herein. For example, a data memory may comprise flash memory, one-time-programmable (OTP) memory or other types of data storage devices.

In summary, the invention described herein generally relates to an improved authentication system and method. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. An access device comprising:
   a memory;
   an access module having a hardware security boundary, the access module including:
   a first interface within the hardware security boundary configured to receive a credential from an input device over a secure communications channel, and
   a security module coupled to the first interface and within the hardware security boundary, the security module configured to cryptographically process the received credential; and
   a second interface configured to transmit the cryptographically processed credential to an access server, wherein the cryptographically processed credential is used to authenticate the access device.

2. The access device of claim 1, wherein the first interface is an RF interface.

3. The access device of claim 1, wherein the first interface is physically connected to an input device.

4. The access device of claim 1, wherein the second interface is configured to receive a set of keys from the access server.

5. The access device of claim 4, wherein the security module is further configured to encrypt the set of keys.

6. The access device of claim 5, wherein the memory stores, the encrypted set of keys.

7. The access device of claim 4, wherein the second interface is further configured to connect to a network using a key in the set of keys.

8. The access device of claim 1, wherein the first interface is a Bluetooth wireless interface.

9. The access device of claim 1, wherein the second interface is further configured to transmit the cryptographically processed credential to an access server via a wireless medium.

10. The access device of claim 1, wherein the second interface is further configured to transmit the cryptographically processed credential to an access server via an electromagnetic medium.

11. The access device of claim 1, wherein the second interface is further configured to send proximity data to the access server and wherein the proximity data is used by the access server to authenticate that the input device is proximate to the access device.

12. The access device of claim 1, wherein the second credential is the same as the first credential.

13. An input device comprising:
   a data input module within a hardware security boundary of the input device, the data input module configured to receive a first credential;
   a security module within the hardware security boundary configured to cryptographically process the received first credential; and
   an interface configured to transmit a second credential to a secure module in an access device over a secure communications channel.

14. The input device of claim 13, wherein the data input module comprises a keypad to enable input of the first credential.

15. The input device of claim 13, wherein the data input module comprises a biometric sensor.

* * * * *